United States Patent
Schmidt et al.

(10) Patent No.: US 12,454,649 B2
(45) Date of Patent: Oct. 28, 2025

(54) HYDROTHERMAL LIQUEFACTION SYSTEM WITH HEAT EXCHANGER NETWORK

(71) Applicant: Battelle Memorial Institute, Richland, WA (US)

(72) Inventors: Andrew J. Schmidt, Richland, WA (US); Lesley J. Snowden-Swan, Ellensburg, WA (US); David B. Spry, Prairieville, LA (US)

(73) Assignee: Battelle Memorial Institute, Richland, WA (US)

( * ) Notice: Subject to any disclaimer, the term of this patent is extended or adjusted under 35 U.S.C. 154(b) by 325 days.

(21) Appl. No.: 18/352,551

(22) Filed: Jul. 14, 2023

(65) Prior Publication Data
US 2024/0018416 A1 Jan. 18, 2024

Related U.S. Application Data

(60) Provisional application No. 63/389,764, filed on Jul. 15, 2022.

(51) Int. Cl.
*C10G 1/06* (2006.01)
*C10B 47/20* (2006.01)
(Continued)

(52) U.S. Cl.
CPC .............. *C10G 1/06* (2013.01); *C10B 47/20* (2013.01); *C10B 51/00* (2013.01); *C10B 53/00* (2013.01);
(Continued)

(58) Field of Classification Search
CPC .......... C10G 1/06; C10G 1/065; C10B 53/00; C10B 49/16; C10B 51/00
See application file for complete search history.

(56) References Cited

U.S. PATENT DOCUMENTS 6,913,700 B2   7/2005   Solheim
8,673,112 B2   3/2014   Nilsen et al.
(Continued)

FOREIGN PATENT DOCUMENTS

CA   2105613 A1   3/1994
CA   3082359 A1   6/2019
(Continued)

OTHER PUBLICATIONS

Barber, "Sludge Thermal Hydrolysis: Application and Potential," IWA Publishing, London, UK, 2020.
(Continued)

*Primary Examiner* — Renee Robinson
(74) *Attorney, Agent, or Firm* — Klarquist Sparkman, LLP

(57) ABSTRACT

A hydrothermal liquefaction (HTL) system has a biomass slurry flow path with a first pump and a first heat exchanger network downstream of the first pump. The first heat exchanger network includes plurality of heat exchangers in a parallel, series, and/or series-parallel flow arrangement. The biomass slurry flow path extends through cold flow sides of the heat exchangers of the first heat exchanger network. The biomass slurry flow path includes a second pump downstream of the first heat exchanger network, and a second heat exchanger network downstream of the second pump. The biomass slurry flow path extends through cold flow sides of the heat exchangers of the second heat exchanger network. A hydrothermal liquefaction (HTL) reactor is downstream of the second heat exchanger network. Heat transfer liquid in a heat transfer liquid circuit flows through hot flow sides of the heat exchangers of the second heat exchanger network.

21 Claims, 14 Drawing Sheets

(51) Int. Cl.
*C10B 51/00* (2006.01)
*C10B 53/00* (2006.01)

(52) U.S. Cl.
CPC ............... *C10G 2300/1003* (2013.01); *C10G 2300/1011* (2013.01)

(56) References Cited

U.S. PATENT DOCUMENTS

| | | | |
|---|---|---|---|
| 9,404,063 | B2 | 8/2016 | Elliott et al. |
| 9,758,728 | B2 | 9/2017 | Elliott et al. |
| 10,167,430 | B2 | 1/2019 | Hart et al. |
| 10,214,751 | B2 | 2/2019 | Nilsen et al. |
| 10,358,357 | B2 | 7/2019 | DiMassimo et al. |
| 11,046,624 | B1 | 6/2021 | Choi et al. |
| 11,124,707 | B2 | 9/2021 | Choi et al. |
| 11,279,882 | B2 | 3/2022 | Thorson et al. |
| 2002/0162332 | A1 | 11/2002 | Hazlebeck |
| 2004/0168990 | A1 | 9/2004 | Solheim |
| 2013/0160683 | A1 | 6/2013 | Dickinson et al. |
| 2015/0259606 | A1 | 9/2015 | Iversen |
| 2016/0186073 | A1 | 6/2016 | Powell et al. |
| 2017/0233659 | A1 | 8/2017 | Pardo et al. |
| 2018/0273850 | A1 | 9/2018 | Bhujade et al. |
| 2018/0291276 | A1* | 10/2018 | Gangwal ............... C10G 45/02 |
| 2019/0016961 | A1 | 1/2019 | Chandran et al. |
| 2019/0071606 | A1 | 3/2019 | Elliott et al. |
| 2022/0017397 | A1 | 1/2022 | Hote et al. |

FOREIGN PATENT DOCUMENTS

| | | |
|---|---|---|
| CN | 209759383 U | 12/2019 |
| DE | 4230266 A1 | 3/1994 |
| EP | 3428130 A1 | 1/2019 |
| EP | 3524579 A1 | 8/2019 |
| SE | 1851671 A1 | 6/2020 |
| WO | 2019020209 A1 | 1/2019 |

OTHER PUBLICATIONS

Berglin et al., "Review and Assessment of Commercial Vendors/Options for Feeding and Pumping Biomass Slurries for Hydrothermal Liquefaction," Pacific Northwest National Laboratory, as prepared by the U.S. Department of Energy, Nov. 2012.

Castello et al., "Continuous Hydrothermal Liquefaction of Biomass: A Critical Review," Energies 11.3165: 1-35, Nov. 15, 2018.

Knorr et al., "Production of Advanced Biofuels via Liquefaction," National Renewable Energy Laboratory, Apr. 5, 2013, 90pps.

Ong et al., "A Heat- and Mass-Integrated Design of Hydrothermal Liquefaction Process Co-Located with a Kraft Pulp Mill," Energy 189: 116235, 2019 (12 pages).

Qian et al., "Hydrothermal Liquefaction of Sewage Sludge under Isothermal and Fast Conditions," Bioresource Technology 232: 27-34, 2017.

Song et al., "Thermal Conductivity Characteristics of Dewatered Sewage Sludge by Thermal Hydrolysis Reaction," Journal of Air & Waste Management Association 64.12: 1384-1389, 2014.

Towler et al., "Chapter 19: Heat Transfer Equipment," Chemical Engineering Design—Principles, Practice, and Economics of Plant and Process Design, 2nd Edition: 1047-1129, 2013.

Towler et al., "Chapter 3: Utilities and Energy Efficient Design," Chemical Engineering Design—Principles, Practice, and Economics of Plant and Process Design, 2nd Edition: 103-160, 2013.

\* cited by examiner

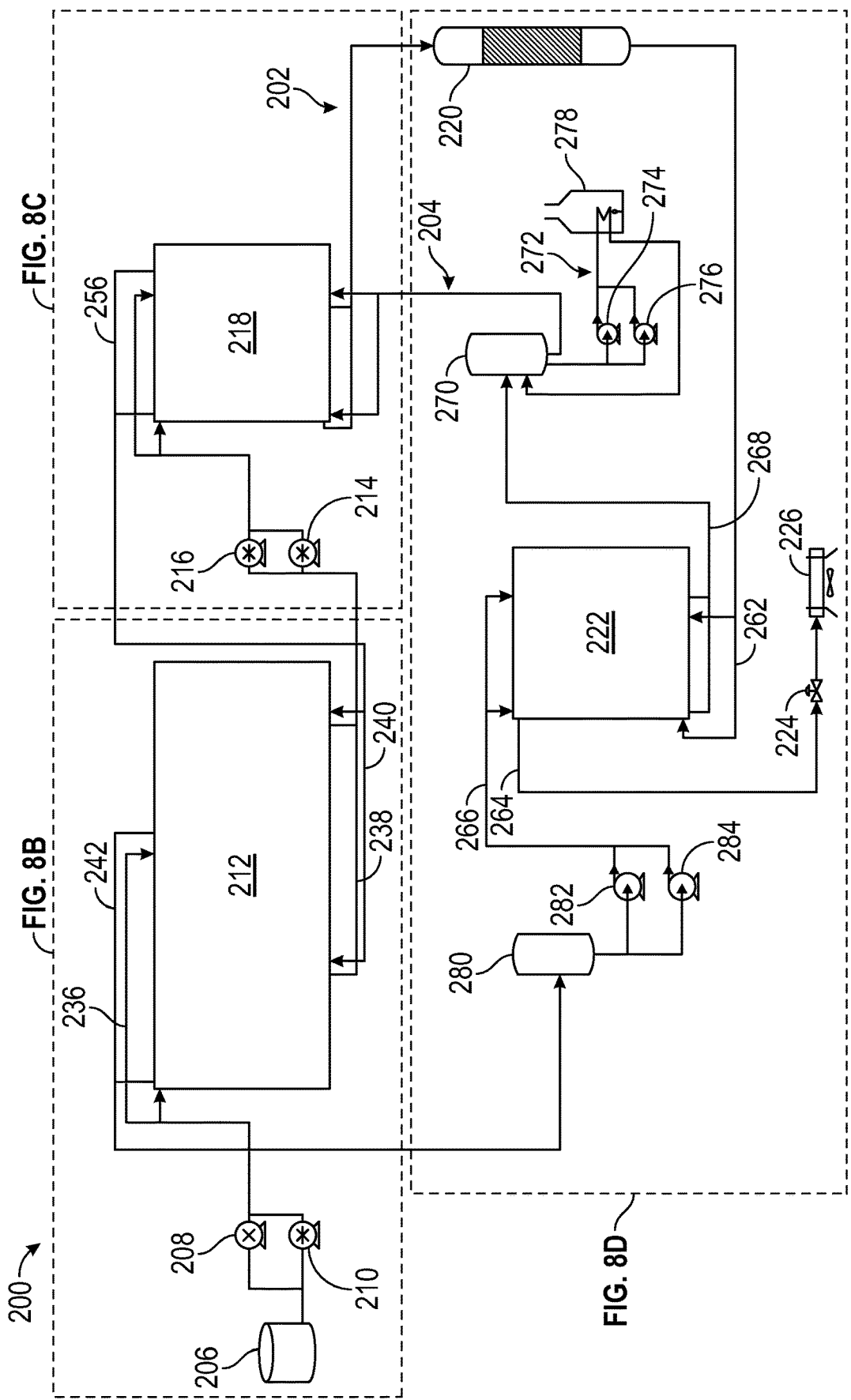

HYDROTHERMAL LIQUEFACTION SYSTEM WITH HEAT EXCHANGER NETWORK

CROSS REFERENCE TO RELATED APPLICATION

The present application claims the benefit of U.S. Provisional Application No. 63/389,764, filed on Jul. 15, 2022, which is incorporated herein by reference in its entirety.

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

The present disclosure relates to hydrothermal liquefaction systems with heat exchanger networks.

SUMMARY

Certain examples of the disclosure pertain to hydrothermal liquefaction systems that include multiple, alternating pressurization and heating steps to heat and pressurize the incoming feed slurry to specified reactor temperature and pressure. The heating steps can be performed in a plurality of heat exchanger networks that include heat exchangers arranged in series, parallel, and/or series-parallel flow arrangements. The hydrothermal liquefaction systems described herein can also include heat transfer liquid circuits for heating the incoming slurry stream with heat recovered from the product stream exiting the hydrothermal liquefaction reactor. The heat exchanger networks, the heat exchangers of the heat exchanger networks, the pumps, the heat transfer liquid circuit, etc., can be configured according to any of the examples described herein and the components can be combined and arranged in any combination.

A representative example of a hydrothermal liquefaction system can include one or a plurality of first pumps that pressurize the incoming slurry stream to a first, intermediate pressure. A first heat exchanger network downstream of the first pump(s) can heat the incoming feed stream in a series of increments to a first temperature. One or a plurality of second pumps downstream of the first heat exchanger network can pressurize the feed stream to a second pressure. A second heat exchanger network downstream of the second pump(s) can heat the feed stream in a series of increments to a second temperature. A hydrothermal liquefaction reactor downstream of the second heat exchanger network can convert biomass in the feed stream to a product stream including biocrude oil and other reaction products. A heat transfer liquid circuit can heat the incoming feed stream, either by heat recovery from the product stream or with heat from other sources such as oil-fired heaters.

In another representative example, a system comprises a biomass slurry flow path comprising a biomass slurry source, a first pump downstream of the biomass slurry source, and a first heat exchanger network downstream of the first pump. The first heat exchanger network comprises a plurality of heat exchangers in a parallel, series, and/or series-parallel flow arrangement. The biomass slurry flow path extends through cold flow sides of the heat exchangers of the first heat exchanger network. The biomass slurry flow path can further comprise a second pump downstream of the first heat exchanger network, and a second heat exchanger network downstream of the second pump, the second heat exchanger network comprising a plurality of heat exchangers in a parallel, series, and/or series-parallel flow arrangement. The biomass slurry flow path extends through cold flow sides of the heat exchangers of the second heat exchanger network. A hydrothermal liquefaction (HTL) reactor can be downstream of the second heat exchanger network. The system can further comprise a heat transfer liquid circuit comprising a heat transfer liquid, and heat transfer liquid in the heat transfer liquid circuit flows through hot flow sides of the heat exchangers of the second heat exchanger network.

In any or all of the examples described herein, heat transfer liquid in the heat transfer liquid circuit flows from the second heat exchanger network through hot flow sides of the heat exchangers of the first heat exchanger network.

In any or all of the examples described herein, the biomass slurry flow path further comprises a third heat exchanger network downstream of the HTL reactor.

In any or all of the examples described herein, the heat transfer liquid circuit further comprises a heat transfer liquid reservoir.

In any or all of the examples described herein, heat transfer liquid in the heat transfer liquid circuit flows through cold flow sides of the heat exchangers of the third heat exchanger network and back to the heat transfer liquid reservoir.

In any or all of the examples described herein, the heat transfer liquid circuit comprises a heater circuit extending from the heat transfer liquid reservoir to a heater and back to the heat transfer liquid reservoir.

In any or all of the examples described herein, the heat transfer liquid reservoir is a first heat transfer liquid reservoir; and the heat transfer liquid circuit further comprises a second heat transfer liquid reservoir downstream of the first heat exchanger network.

In any or all of the examples described herein, heat transfer liquid in the heat transfer liquid circuit flows from the second heat exchanger network through hot flow sides of the heat exchangers of the first heat exchanger network; and the heat transfer liquid circuit further comprises a jumpover line coupling the heat transfer liquid reservoir and the first heat exchanger network that bypasses the second heat exchanger network.

In any or all of the examples described herein, the first heat exchanger network and/or the second heat exchanger network comprise a plurality of heat exchangers arranged in a plurality of parallel heat exchanger strings, wherein each of the parallel heat exchanger strings comprises a plurality of heat exchangers in series.

In any or all of the examples described herein, the first heat exchanger network comprises spiral heat exchangers.

In any or all of the examples described herein, the heat transfer liquid circuit further comprises a heat transfer liquid reservoir in fluid communication with the second heat exchanger network such that heat transfer liquid in the heat transfer liquid circuit flows from the heat transfer liquid reservoir through the second heat exchanger network and back to the heat transfer liquid reservoir.

In any or all of the examples described herein, a product mixture stream from the HTL reactor flows through hot flow sides of the spiral heat exchangers of the first heat exchanger network.

In any or all of the examples described herein, the biomass slurry flow path further comprises a pressure let down valve downstream of the HTL reactor to reduce a pressure of the product mixture stream.

In any or all of the examples described herein, the biomass slurry flow path further comprises a product cooler heat exchanger between the HTL reactor and the pressure let down valve to reduce a temperature of a product mixture stream received from the HTL reactor.

In any or all of the examples described herein, the product cooler heat exchanger is a waste heat recovery boiler for recovering heat from the product mixture stream to generate steam.

In any or all of the examples described herein, a method comprises flowing a biomass slurry through any of the hydrothermal liquefaction systems described herein and producing biocrude oil.

In another representative example, a system comprises a biomass slurry flow path, comprising: a biomass slurry source; a first pump downstream of the biomass slurry source; a first heat exchanger downstream of the first pump, the first heat exchanger being a spiral heat exchanger, the biomass slurry flow path extending through a cold flow side of the spiral heat exchanger; a second pump downstream of the first heat exchanger; a second heat exchanger downstream of the second pump; a hydrothermal liquefaction (HTL) reactor downstream of the second heat exchanger; and a heat transfer liquid circuit, comprising: a heat transfer liquid reservoir; and a heater in fluid communication with the heat transfer liquid reservoir; wherein a product mixture stream from the HTL reactor flows through a hot flow side of the spiral heat exchanger to heat biomass slurry in a cold flow side of the spiral heat exchanger; and wherein heat transfer liquid flows from the heat transfer liquid reservoir through a hot flow side of the second heat exchanger and back to the heat transfer liquid reservoir.

In any or all of the examples described herein, the spiral heat exchanger is one of a plurality of spiral heat exchangers in a first heat exchanger network of the biomass slurry flow path.

In any or all of the examples described herein, the biomass slurry flow path further comprises a pressure let down valve downstream of the HTL reactor to reduce a pressure of the product mixture stream.

In any or all of the examples described herein, the biomass slurry flow path further comprises a product cooler heat exchanger between the HTL reactor and the pressure let down valve to reduce a temperature of a product mixture stream received from the HTL reactor.

In any or all of the examples described herein, the product cooler heat exchanger is a waste heat recovery boiler for recovering heat from the product mixture stream to create steam.

The foregoing and other objects, features, and advantages of the disclosed technology will become more apparent from the following detailed description, which proceeds with reference to the accompanying figures.

BRIEF DESCRIPTION OF THE DRAWINGS

FIG. 8A is a schematic block diagram of another example of a hydrothermal liquefaction system including a plurality of heat exchanger networks and a heat transfer liquid circuit.

DETAILED DESCRIPTION

Explanation of Terms

Figure 1:
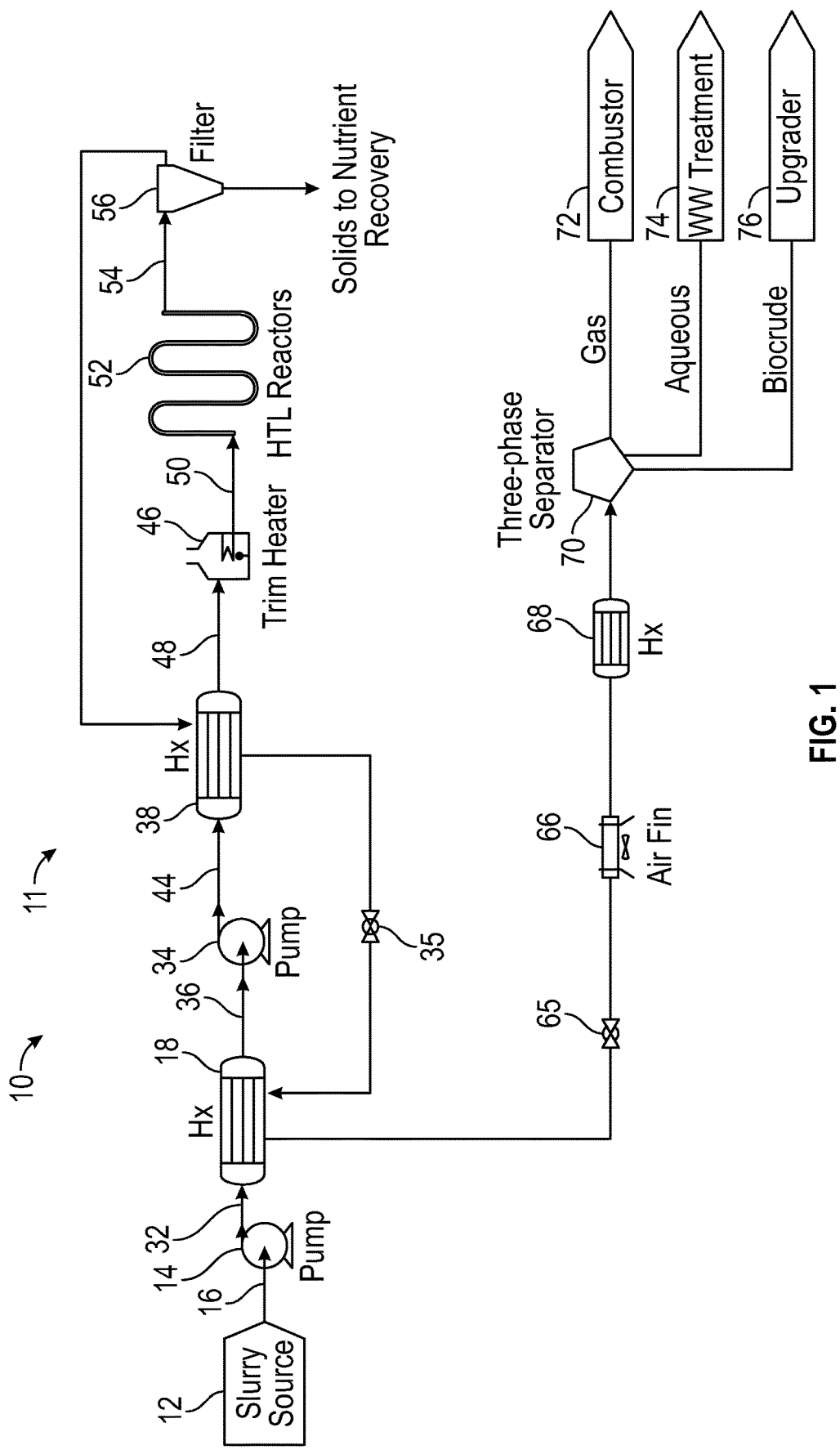
FIG. 1 is a schematic diagram of a hydrothermal liquefaction system where a biomass slurry stream is pressurized and heated in multiple steps, according to one example.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, forces, moments, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

Unless specifically defined, values and relationships modified by the term "substantially" are within a range of ±10% of the stated value or relationship.

Overview of the Disclosed Technology

The present disclosure pertains to hydrothermal liquefaction (HTL) systems for converting feedstocks containing organic materials (e.g., wastewater sewage sludge, algae, pulp, wood, or other biomass) into biocrude oil and gases. The biomass feedstock is typically provided as a slurry, which is pressurized and heated to a relatively high pressure and temperature before being fed into a HTL reactor that converts the biomass into biocrude and other reaction products.

The systems described herein accomplish the pressurization and heating of the biomass slurry feedstock in a series of pressurization steps and a series of heating steps, which can occur in various combinations. The systems described herein can further provide for heat recovery from the high temperature product mixture stream exiting the HTL reactor. Such heat recovery can be via direct heat exchange between the product mixture stream and the incoming biomass slurry stream, by indirect heat exchange wherein heat is recovered from the product mixture stream and transferred to the incoming biomass slurry using an intermediate heat transfer liquid, or both.

Any or all of the examples described herein can comprise a first flow path referred to herein as a biomass slurry flow path that extends from a biomass slurry source (e.g., a reservoir, pond, vessel, etc.) through a plurality of pumps and heat exchangers to a HTL reactor, from the HTL reactor to heat recovery heat exchangers (which can be the same or different as the upstream heat exchangers), and to pressure let down, further cooling, phase separation, product collection, etc.

Any or all of the examples herein can comprise a plurality of heat exchangers arranged in groups referred to hereinafter as heat exchanger networks. Each heat exchanger network can comprise a plurality of heat exchangers in series, in parallel, and/or in a plurality of parallel flow paths wherein each parallel flow path comprises a plurality of heat exchangers in series (also referred to as a "train," a "string" and a "series-parallel" arrangement). The biomass slurry flow path can extend through the cold stream flow channels (for which another term is the "cold sides") of the heat exchangers for the biomass slurry heating steps, and/or through the hot stream flow channels (for which another term is the "hot sides") of the heat exchangers for the heat recovery steps.

Any or all of the examples described herein can further comprise a second flow path referred to herein as a heat transfer liquid circuit. The heat transfer liquid circuit can contain a heat transfer liquid, such as any of a variety of thermally stable natural or synthetic organic liquids (e.g., DOWTHERM™). The heat transfer liquid circuit can comprise a heat transfer liquid reservoir for storing heated heat transfer liquid. In certain examples, the heat transfer liquid can be heated by the product mixture stream, by a heater, or both. In certain examples, the heat transfer liquid can flow through any or all of the heat exchanger networks of the system either as the "hot stream" (e.g., for heating the biomass slurry "cold stream") and/or as the "cold stream" (e.g., to recover heat from the product mixture stream). In certain examples, the heat transfer liquid circuit can comprise a second heat transfer liquid reservoir for storing "cold" heat transfer liquid after heating the biomass slurry stream in one or more of the heat exchanger networks.

In certain examples, a hydrothermal liquefaction system can comprise a biomass slurry flow path including a biomass slurry source. In certain examples, a first pump or a first plurality of pumps (e.g., in parallel and/or in series) can be downstream of the biomass slurry source in the biomass slurry flow path. The first pump or first plurality of pumps can pressurize a biomass slurry stream from the biomass slurry source to a first pressure. In certain examples, a first heat exchanger and/or a first heat exchanger network can be downstream of the first plurality of pumps in the biomass slurry flow path. In examples including a first heat exchanger network, the first heat exchanger network can comprise a plurality of heat exchangers arranged in parallel and/or in series (e.g., the heat exchangers can be arranged in a plurality of parallel flow paths wherein each of the parallel flow paths includes a plurality of heat exchangers in series). In certain examples, the first heat exchanger network can heat the biomass slurry stream at the first pressure to a specified first temperature. In certain examples, the biomass slurry stream can be heated to the specified first temperature in intermediate increments in the serial heat exchangers of the first heat exchanger network.

In certain examples, a second pump or a second plurality of pumps can be downstream of the first heat exchanger network along the biomass slurry flow path. The second pump and/or the second plurality of pumps can pressurize the biomass slurry stream at the first temperature to a second pressure that is greater than the first pressure. In certain examples, a second heat exchanger and/or a second heat exchanger network can be downstream of the second plurality of pumps along the biomass slurry flow path. In examples including a second heat exchanger network, the second heat exchanger network can comprise a plurality of heat exchangers arranged in parallel and/or in series (e.g., the heat exchangers can be arranged in a plurality of parallel flow paths wherein each of the parallel flow paths includes a plurality of heat exchangers in series). In certain examples, the second heat exchanger network can heat the biomass slurry stream at the second pressure to a specified second temperature. In certain examples, the biomass slurry stream can be heated to the specified second temperature in intermediate increments in the serial heat exchangers of the second heat exchanger network.

In certain examples, a hydrothermal liquefaction (HTL) reactor can be downstream of the second heat exchanger network along the biomass slurry flow path. In certain examples, the HTL reactor can receive the biomass slurry stream of the second heat exchanger network at the second temperature and the second pressure and can produce a product mixture stream by converting the biomass material to biocrude oil and other reaction products.

In certain examples, a third heat exchanger and/or a third heat exchanger network can be downstream of the HTL reactor along the biomass slurry flow path. In examples including a third heat exchanger network, the third heat exchanger network can receive the high temperature, high pressure product mixture stream and recover heat from the product mixture stream. In certain examples, heat recovery from the product mixture stream can be by heat exchange with a heat transfer liquid flowing in a heat transfer liquid circuit extending through the third heat exchanger network.

In certain examples, a pressure let down valve and/or a product cooler heat exchanger can be downstream of the third heat exchanger network along the biomass slurry flow path. The pressure let down valve can reduce the pressure of the product mixture stream, and the product cooler heat exchanger can cool the product mixture stream for phase separation and further processing.

In certain examples, a heat transfer liquid reservoir can be downstream of the third heat exchanger network along the heat transfer liquid circuit. The heat transfer liquid reservoir can receive heat transfer liquid heated to a first heat transfer liquid temperature by the product mixture stream in the third heat exchanger network. In certain examples, a liquid circuit can extend from the heat transfer liquid reservoir to a heater and back to the heat transfer liquid reservoir. In certain examples, the heater can heat the heat transfer liquid to a second heat transfer liquid temperature that is greater than the first heat transfer liquid temperature.

In certain examples, the second heat exchanger network can be downstream of the heat transfer liquid reservoir along the heat transfer liquid circuit. In certain examples, heat transfer liquid can flow (e.g., can be pumped) from the heat transfer liquid reservoir through the second heat exchanger network where the heat transfer liquid can heat the biomass slurry stream to the second temperature. In certain examples the temperature of the heat transfer liquid can be reduced to a third heat transfer liquid temperature in the second heat exchanger network.

In certain examples, the first heat exchanger network can be downstream of the second heat exchanger network along the heat transfer liquid circuit. In certain examples, the heat transfer liquid can flow from the second heat exchanger network through the first heat exchanger network at the third heat transfer liquid temperature to heat the biomass slurry stream to the first temperature. In certain examples the temperature of the heat transfer liquid can be reduced to a fourth heat transfer liquid temperature in the first heat exchanger network.

In certain examples, a second heat transfer liquid reservoir can be downstream of the first heat exchanger network along the heat transfer liquid circuit. The second heat transfer liquid reservoir can receive and store heat transfer liquid at the fourth heat transfer liquid temperature from the first heat exchanger network. In certain examples, heat transfer liquid from the second heat transfer liquid reservoir can be pressurized and can flow through the third heat exchanger network and back to the first heat transfer liquid reservoir at the first heat transfer liquid temperature.

In certain examples, a pressure let down valve can be downstream of the HTL reactor along the biomass slurry flow path. In certain examples, the pressure of the product mixture stream can be reduced at the pressure let down valve, and the product mixture stream can flow through the first heat exchanger network downstream of the pressure let down valve to heat the biomass slurry to the first temperature. In certain examples, a heat transfer liquid circuit can extend from a heat transfer liquid reservoir through the second heat exchanger network and back to the heat transfer liquid reservoir. In certain examples, heat transfer liquid in the heat transfer liquid reservoir can be circulated through a heater to heat the heat transfer liquid to a first heat transfer liquid temperature.

In certain examples, the product mixture stream can flow from the HTL reactor through a second heat exchanger and/or a second heat exchanger network to heat the biomass slurry to the second temperature, and through a pressure let down valve downstream of the second heat exchanger and/or the second heat exchanger network to reduce the pressure of the product mixture stream. In certain examples, the product mixture stream can then flow through a first heat exchanger and/or a first heat exchanger network to heat the biomass slurry to the first temperature. In certain examples, the pressure of the product mixture stream entering the second heat exchanger and/or the second heat exchanger network can be equal to or substantially equal to (e.g., ±40%, such as ±20%, ±10%, etc.) the pressure of the biomass slurry stream (e.g., the second pressure) entering the second heat exchanger and/or the second heat exchanger network. In certain examples, the pressure let down valve downstream of the second heat exchanger and/or the second heat exchanger network can reduce the pressure of the product mixture stream to a pressure that is equal to or substantially equal to (e.g., ±40%, such as ±20%, ±10%, etc.) the pressure of the biomass slurry stream entering the first heat exchanger and/or the first heat exchanger network (e.g., the first pressure).

Example 1: Representative Hydrothermal Liquefaction System

Hydrothermal liquefaction (HTL) is a process that employs a pressurized hot water reaction environment in a reactor to thermochemically convert feedstocks containing organic materials and/or biomass into biocrude oils and gases. In existing systems, biomass feedstocks are typically provided as a slurry, which must be heated and pressurized to the relatively high temperature and pressure at which the HTL reaction(s) take place. Thus, existing systems first pressurize the biomass slurry to the pressure required by the reactor, then heat the pressurized slurry in one or more heat exchangers. In a typical system, this can require pressurizing a viscous slurry at ambient temperature to 3,000 psi (207 bar) or greater, then heating the pressurized slurry in one or more heat exchangers to 600° F. (315° C.) or greater. Such systems require robust pumps that can pump viscous, abrasive slurries to high pressures. Additionally, heat exchangers that can accommodate abrasive slurries at such high pressure and viscosity, and heat them to such high temperatures, are difficult and expensive to manufacture, suffer from poor thermal efficiency, and result in high pressure drops. Accordingly, there exists a need for improved systems and methods of HTL production of biocrude.

Certain embodiments of the disclosure pertain to hydrothermal liquefaction (HTL) systems and associated methods of converting biomass or organic matter to biocrude oils and gases. In particular, certain embodiments pertain to flow circuit configurations in which pressurization and heating of the biomass slurry feedstock to the specified reactor temperature and pressure occurs in multiple steps to account for changes in the viscosity of the biomass slurry. The viscosity of the biomass slurry stream can change significantly as it is pressurized and heated. For example, in certain embodiments the viscosity of the biomass slurry at ambient temperature can be relatively high (e.g., 300 cP to 20,000 cP) (0.3 pa·s to 20 pa·s), making pumping difficult and resulting in a relatively high pressure drop across fluid circuit components such as heat exchangers. However, once heated and pressurized to the specified reactor temperature and pressure (e.g., 630° F. and 3,100 psi in certain embodiments), the biomass slurry can exhibit a significantly lower viscosity, which can be comparable to that of water (e.g., 0.9 cP). This can result in significantly reduced pumping requirements, reduced pressure drops across downstream components of the flow circuit, and increased heat transfer efficiency.

The HTL systems and flow circuits described herein pressurize and heat the biomass slurry in multiple discrete steps. For example, rather than pressurizing the cold biomass slurry to the specified reactor pressure (or beyond) before heating, certain embodiments of the systems described herein pressurize the biomass slurry to an intermediate pressure, then heat the pressurized biomass slurry to an intermediate temperature which can correspond to a specified viscosity of the biomass slurry. Being more amenable to pumping, the heated, pressurized, reduced viscosity biomass slurry can then be further pressurized and/or heated in one or a series of additional steps to the specified reactor temperature and pressure. The discretized pressurization and heating can allow each of the pumps and heat exchangers of the system to be configured for handling the biomass slurry for specific, narrower temperature, pressure, and/or viscosity ranges than existing systems, resulting in increased pumping and thermal efficiency, and significantly reduced cost.

FIG. 1 illustrates a representative embodiment of a HTL reactor system 10, according to one embodiment. The system 10 can comprise a liquid circuit 11 including a biomass slurry source 12 in fluid communication with a first pump 14. The biomass slurry source 12 can be, for example, a tank, a reservoir, or other storage containing a liquid feedstock comprising particulates of organic matter suspended in an aqueous liquid (e.g., water). Representative examples of biomass feedstocks can include plants, algae (e.g., macroalgae and microalgae), photosynthetic cyanobacteria, animal wastes, food and liquid processing wastes (e.g., meat solids and/or dairy liquids), cellulosic materials such as wood, sewage effluent such as municipal waste water, slurries, pastes, or sludges comprising any of the above materials, or any other organic matter. In certain embodiments, the liquid feedstock can comprise 15% to 30% organic material solids or particulates by mass, and 70% to 85% water by mass. In certain embodiments, the biomass slurry source 12 can comprise a stirrer or agitator to maintain the organic matter in a suspended state in the liquid. In certain embodiments, the ratio of solids to liquid can be adjusted or maintained at specified levels by addition of water and/or organic matter.

In certain embodiments, the pump 14 can be a slurry pump adapted to pump a liquid containing suspended solid particles. For example, in certain embodiments the pump 14 can be any of various dynamic pumps such as a centrifugal pump, or any of various positive displacement pumps such as a piston pump, a peristaltic pump, a diaphragm pump, or a gear pump, to name a few. In particular embodiments, the pump 14 can be a rotary lobe or diaphragm pump. The pump 14 can be configured to pump or pressurize a biomass slurry stream 16 received from the biomass slurry source 12 from ambient pressure to a first pressure or intermediate pressure $P_1$ that is greater than the ambient pressure. For example, in certain embodiments the first pressure $P_1$ can be from 400 psi (28 bar) to 1,500 psi (103 bar), such as from 500 psi (35 bar) to 1,500 psi (103 bar), 700 psi (48 bar) to 1,200 psi (83 bar), or 800 psi (55 bar) to 1,100 psi (76 bar). In particular embodiments, the pump 14 can pressurize the biomass slurry stream to a first pressure $P_1$ of 1,500 psi (103 bar).

Figure 2:
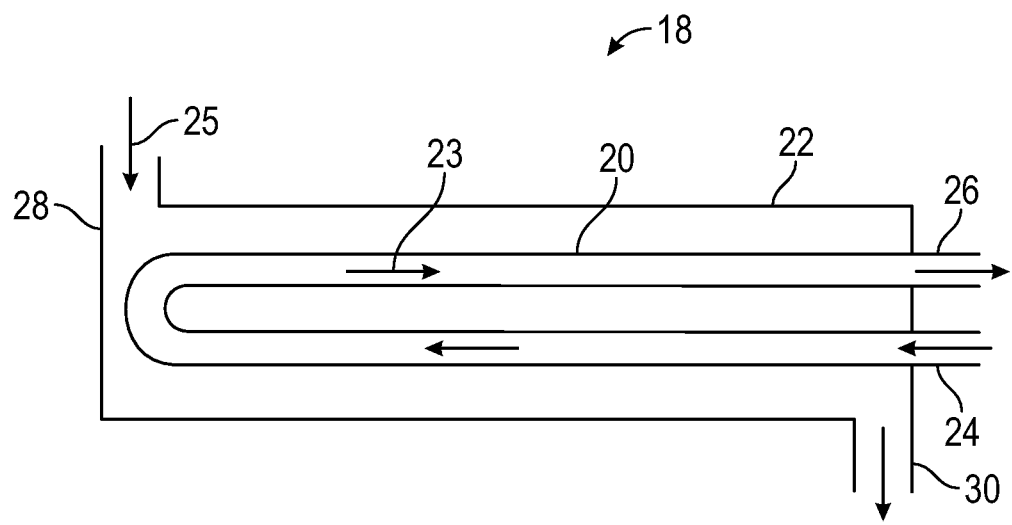
FIG. 2 is a schematic diagram of a heat exchanger, according to one example.

The pump 14 can be in fluid communication with a heat exchanger 18 downstream of the pump 14. The heat exchanger 18 can be configured as any of a variety of heat exchanger types, such as a parallel flow heat exchanger, a counter flow heat exchanger, a shell and tube heat exchanger, or a cross flow heat exchanger, to name a few. Referring to FIG. 2, in certain embodiments the heat exchanger 18 can be configured as a shell and tube heat exchanger comprising a plurality of tubes 20 situated in a shell 22. In the illustrated embodiment the tubes 20 can comprise respective inlets 24 and outlets 26, and the shell 22 can comprise an inlet 28 and an outlet 30. The tubes 20 are shown extending from the inlets 24 along the length of the shell and curving back to the outlets 26, which are on the same end of the shell as the inlets such that the tubes extend through the shell for two "passes." However, the tubes can comprise any number of passes, and the inlets and outlets of the tubes need not be located on the same side of the shell. Flow through the tubes 20 can be in the direction indicated by arrows 23, and flow through the shell can be in the direction indicated by arrows 25, although the flow directions may be reversed. The tubes 20 can comprise any of a variety of metal alloys, such stainless steel (e.g., SS316, SS316L, etc.), carbon steel, or other steel or titanium alloys.

In certain embodiments, the tubes 20 can be the "cold side" of the heat exchanger and configured to receive the liquid to be heated. Thus, returning to FIG. 1, in certain embodiments the tubes 20 can be configured to receive the pressurized biomass slurry stream 32 from the slurry pump 14. The shell 22 can be the "hot side" of the heat exchanger, and can be configured to receive a heat transfer liquid at elevated temperature to heat the biomass slurry stream in the tubes 20, as discussed below.

Figure 3:
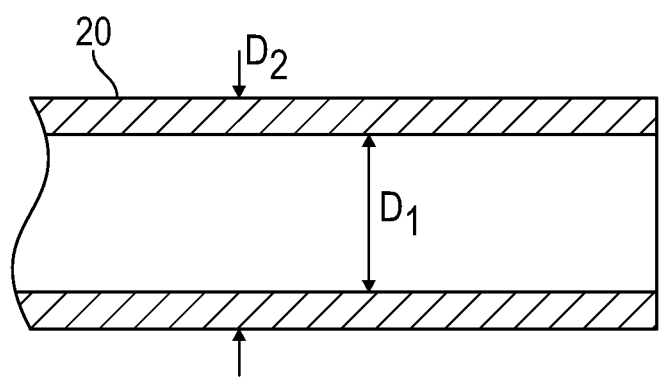
FIG. 3 is a cross-sectional view of a tube of the heat exchanger of FIG. 2, according to one example.

FIG. 3 illustrates a representative tube 20 in cross-section. The tubes 20 can have an inner diameter $D_1$ and an outer diameter $D_2$. The inner and outer diameters, along with the lengths of the tubes, can be selected to permit flow of the biomass slurry through the tubes 20 while limiting pressure loss to at or below a specified threshold, and such that the biomass slurry is heated to a specified temperature. For example, in certain embodiments the inner diameter $D_1$ of the tubes 20 can be from 0.5 inch to 3 inches (1.25 cm to 7.5 cm), such as 0.5 inch to 2 inches (1.25 cm to 5 cm), or 0.75 inch to 1.5 inches (1.875 cm to 3.75 cm). In particular embodiments, the inner diameter $D_1$ of the tubes 20 can be 1 inch. The outer diameter $D_2$ can be 0.7 inch to 3.5 inches, such as 1 inch to 2.5 inches, or 1.2 inches to 1.75 inches. In particular embodiments, the outer diameter $D_2$ of the tubes 20 can be 1.2 inches.

The heat exchanger 18 can be configured to increase the temperature of the biomass slurry from ambient temperature (or a temperature at the outlet of the pump 14) (e.g., 60° F.)

to a first temperature or intermediate temperature $T_1$ between the inlets 24 and the outlets 26 of the tubes 20. In certain embodiments, the heat exchanger 18 can be configured to heat the biomass slurry stream to a first temperature $T_1$ of 200° F. to 700° F. (93° C. to 371° C.), such as 300° F. to 600° F. (149° C. to 316° C.), or 350° F. to 550° F. (177° C. to 288° C.). In particular embodiments, the heat exchanger 18 can be configured to heat the biomass slurry stream to a first temperature $T_1$ of 500° F. (260° C.).

The temperature increase of the biomass slurry stream can result in an associated viscosity reduction. For example, at the inlets 24 of the tubes 20, the viscosity of the biomass slurry stream can be 200 cp to 30,000 cp (0.2 pa·s to 30 pa·s), such as 300 cP to 20,000 cP (0.3 pa·s to 20 pa·s), or 500 cP to 15,000 cP (0.5 pa·s to 15 pa·s), depending upon the type(s) if organic matter in the slurry, the particle size, the water content, and/or the presence and quantity of other non-organic solids. Upon exiting the heat exchanger 18, the viscosity of the biomass slurry stream can be 300 cP (0.3 pa·s) or less, such as 200 cP (0.2 pa·s) or less, 0.5 cP to 200 cP (0.0005 pa·s to 0.2 pa·s), or 0.5 cP to 100 cP (0.0005 pa·s to 0.1 pa·s). Thus, the viscosity of the heated, pressurized biomass slurry stream exiting the heat exchanger 18 can be significantly lower than at the inlet.

In certain embodiments, at the temperature, pressure, and/or viscosity ranges given above, and in tubes 20 having the diameter ranges given above, flow of the biomass slurry stream through at least an initial portion of the first heat exchanger 18 can be laminar, or substantially laminar. That is, the Reynolds number of the biomass slurry stream in a tube 20 is 2,300 or less, where the Reynolds number can be determined using the formula given below, in which ρ is the density of the fluid, u is the average velocity of the tube in a tube 20, L is a characteristic linear dimension (e.g., the length of a tube pass), μ is the dynamic viscosity of the fluid, and ν is the kinematic viscosity of the fluid.

$$\mathrm{Re} = \frac{\rho u L}{\mu} = \frac{u L}{\nu}$$

As the biomass slurry stream is heated and the viscosity decreases, the Reynolds number can increase such that at the outlets 26 of the tubes 20 the flow can be laminar, in a transition flow regime (e.g., exhibiting a Reynolds number of 2,300 to 2,900), or turbulent (e.g., Reynolds number greater than 2,900).

Returning to FIG. 1, the tubes 20 of the heat exchanger 18 can be in fluid communication with a second pump 34 downstream of the heat exchanger 18. The pump 34 can be, for example, any of various dynamic pumps such as a centrifugal pump, or any of various positive displacement pumps such as a piston pump, a peristaltic pump, a diaphragm pump, or a gear pump as described above, depending upon the specified flow rate, temperature, and pressure of the reactor system. The pump 34 can be configured to receive a pressurized, heated biomass slurry stream 36 from the heat exchanger 18, and pressurize the stream to a second pressure $P_2$ that is higher than the first pressure $P_1$. For example, in certain embodiments the pump 34 can be configured to receive the biomass slurry stream at a temperature of 200° F. (93° C.) or above, such as 300° F. (150° C.) or above, and pressurize the stream to a second pressure $P_2$ of 2,000 psi to 4,000 psi (138 bar to 275 bar), such as 2,500 psi to 3,500 psi (172 bar to 242 bar), or 3,000 psi to 3,500 psi (207 bar to 242 bar). In particular embodiments, the pump 34 can be configured to pressurize the stream to a second pressure $P_2$ of 3,100 psi (214 bar). In certain embodiments, the biomass slurry stream exiting the pump 34 can have the same or a similar viscosity as upon exiting the heat exchanger 18.

In particular embodiments, the pump 34 can be configured to handle abrasive liquids at elevated temperatures. For example, in certain embodiments the pump 34 can be a positive displacement pump as recited elsewhere herein.

Figure 4:
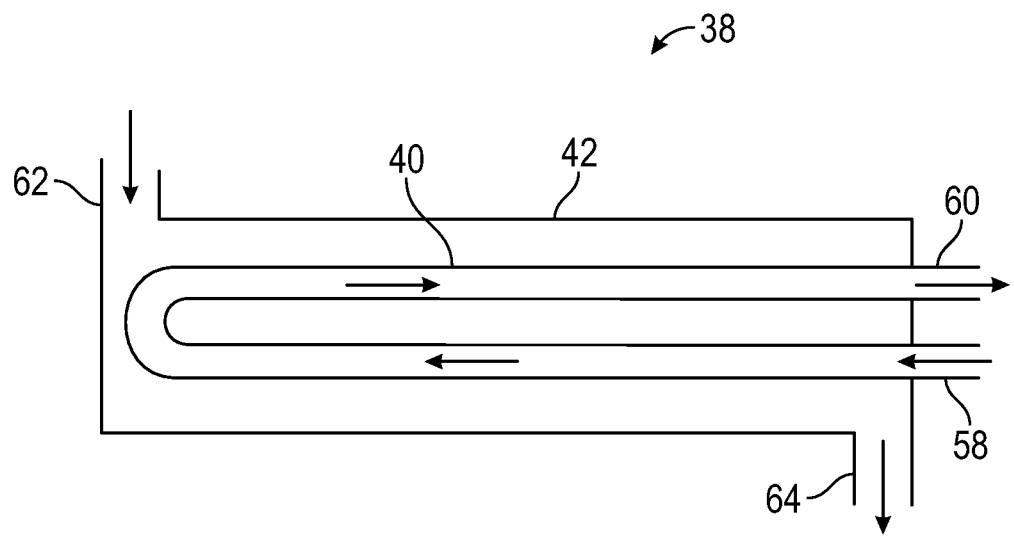
FIG. 4 is a schematic diagram of a heat exchanger, according to another example.

The pump 34 can be in fluid communication with a second heat exchanger 38 downstream of the pump 34. In certain embodiments, the heat exchanger 38 can be a shell and tube heat exchanger configured similarly to the heat exchanger 18, but can be configured as any type of heat exchanger described herein depending upon the particular requirements of the system. Referring to FIG. 4, the heat exchanger 38 can comprise a plurality of tubes 40 arranged in a shell 42, similar to the heat exchanger 18. The tubes 40 can extend between respective inlets 58 and outlets 60. The shell 42 can comprise an inlet 62 and an outlet 64.

Figure 5:
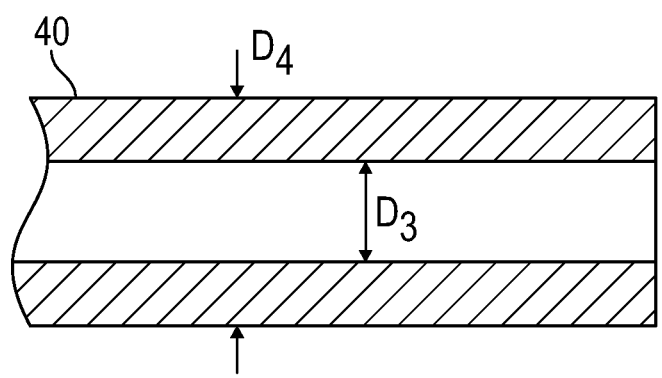
FIG. 5 is a cross-sectional view of a tube of the heat exchanger of FIG. 4, according to one example.

Referring to FIG. 5, the tubes 40 can have an inner diameter $D_3$ and an outer diameter $D_4$. In certain embodiments, the inner diameter of the tubes 40 can be smaller than the tubes 20 of the first heat exchanger 18, and the pipe walls can be thicker to accommodate increased pressure. Thus, in certain embodiments the inner diameter $D_3$ of the tubes 40 can be 0.75 inch to 2 inches (2 cm to 5 cm). The outer diameter $D_4$ can be 1 inch to 3 inches (2.5 cm to 7.6 cm). The tubes can comprise stainless steel, carbon steel, or any of the other metals or metal alloys listed herein.

Returning to FIG. 1, the heat exchanger 38 can be configured to increase the temperature of a biomass slurry stream 44 received from the pump 34 from the first temperature $T_1$ (or a temperature at the outlet of the pump 34) (e.g., 513° F.) (267° C.) to a second temperature $T_2$. In certain embodiments, the heat exchanger 38 can be configured to heat the biomass slurry stream to a second temperature $T_2$ of 400° F. to 900° F. (204° C. to 482° C.), such as 500° F. to 800° F. (260° C. to 427° C.), or 500° F. to 700° F. (260° C. to 372° C.). In particular embodiments, the heat exchanger 38 can be configured to heat the biomass slurry stream to a second temperature $T_2$ of 630° F. (332° C.).

In certain embodiments, at the temperature ranges given above for $T_2$, the pressure ranges given above for $P_2$, and/or the viscosity ranges given above upon exiting the pump 34, and in tubes 40 having the diameter ranges given above, flow of the biomass slurry stream through the second heat exchanger 38 can be turbulent, or substantially turbulent. That is, the Reynolds number of the biomass slurry stream in a tube 40 according to the formula above can be 2,900 or greater. As the biomass slurry stream is heated, the viscosity can further decrease resulting in a turbulent flow regime along the entire length or nearly the entire length of the tubes 40, with the associated increase in heat transfer from the heat transfer liquid in the shell to the biomass slurry stream.

In certain embodiments, the system can further comprise a heater configured as a trim heater 46 downstream of and in fluid communication with the heat exchanger 38. The trim heater 46 can be, for example, an electrical resistance heater, a gas heater, or any other type of heater depending upon the performance requirements of the system, and can be configured to heat a biomass slurry stream 48 received from the heat exchanger 38 to a third temperature $T_3$. In certain embodiments, the temperature $T_3$ can be from 640° F. to 750° F. (338° C. to 400° C.). A biomass slurry stream 50 can then flow from the trim heater 46 to a HTL reactor schematically illustrated at 52, where the organic matter in the biomass slurry can be converted to biocrude, gases, and other reaction products.

The HTL reactor 52 can be any of various HTL reactors, such as a plug-flow reactor, a continuous stirred-tank reactor (CSTR), or a turbulence-induction reactor, in which the organic biomass slurry stream is provided in a super-heated (e.g., subcritical) state and the organic matter is converted to biocrude, gases, and other reaction products in the presence of various catalysts (e.g., sulfided-ruthenium). Further details regarding reactor configurations, chemical processes, and catalysts that can be employed in the reactor 52 can be found in U.S. Pat. Nos. 10,167,430 and 9,758,728, which are incorporated herein by reference.

In certain embodiments, the reactor 52 can be in fluid communication with the heat exchanger 38 and/or the heat exchanger 18 such that a high temperature product stream from the reactor can be provided to the hot sides or shell sides of the heat exchangers to heat the biomass slurry stream. For example, referring again to FIG. 1 a product stream 54 comprising, for example, biocrude, water, gas, and/or other constituents, can exit the reactor 52 and flow through a filter 56 to remove remaining solids from the product stream. In certain embodiments, the solids can be sent for further processing, such as nutrient recovery. The filtered product stream can then be provided to the shell side of the heat exchanger 38 (e.g., via the inlet 62), where it can heat the biomass stream 44 in the tubes 40. In certain embodiments, the product stream can be provided to the second heat exchanger 38 at a temperature of 400° F. to 900° F. (200° C. to 485° C.). Flowing the product stream through the heat exchanger 38 can lower the temperature of the product stream from 900° F. to 400° F. (485° C. to 200° C.), such as 750° F. to 500° F. (400° C. to 260° C.) or 600° F. to 500° F. (315° C. to 260° C.).

The shells of the heat exchangers 18 and 38 can be connected in series such that upon exiting the heat exchanger 38, the product stream can then flow into the shell 22 of the heat exchanger 18 via the inlet 28 (FIG. 2) where it can heat the biomass slurry stream 32 in the tubes 20. In certain embodiments, the product stream can flow into the heat exchanger 18 at a temperature of 300° F. to 600° F. (149° C. to 316° C.). Upon exiting the heat exchanger 18, the product stream can then flow through one or a series of additional heat exchangers or coolers for cooling. For example, in the illustrated embodiment the product stream can flow through a heat exchanger configured as an air-to-liquid (e.g., fin and tube) heat exchanger 66, and from there to a water-cooled shell and tube heat exchanger 68.

From the heat exchanger 68, the product stream can flow to a multi-phase (e.g., three-phase) separator apparatus 70, which can separate the product stream into its constituent components. Gas separated from the product stream can be provided to a combustor 72. The aqueous liquid of the product stream can be provided to a waste water treatment system 74, and biocrude separated from the product stream can be provided to an upgrader system 76 for further processing. Further details regarding the separator 70 can be found in U.S. Pat. No. 9,404,063, which is incorporated herein by reference.

Figure 6:
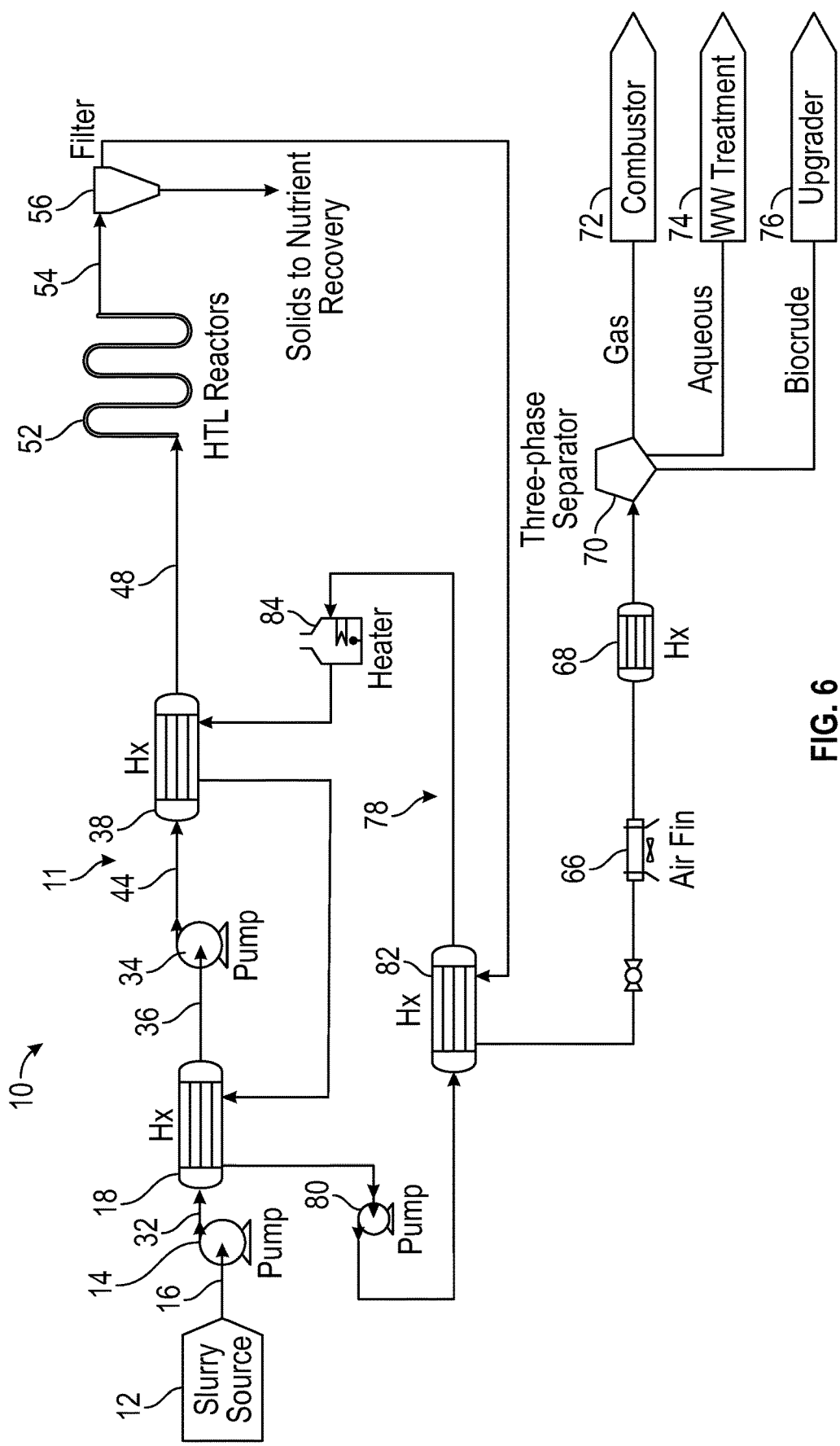
FIG. 6 is a schematic block diagram of a hydrothermal liquefaction system where a product stream is used to heat a heat transfer liquid in a separate liquid circuit, according to one example.

FIG. 6 illustrates another configuration of the HTL reactor system 10 in which the heat transfer liquid provided to the hot sides of the heat exchangers 18 and 38 is a liquid other than the product stream 54 from the reactor 52. The liquid can be provided in a separate liquid circuit 78 comprising a pump 80, a heat exchanger 82, and an optional heater 84. The shells of the heat exchangers 38 and 18 can be a part of the liquid circuit 78 and connected, respectively, in series. The heat transfer liquid in the liquid circuit 78 can be an aqueous liquid, an oil, a liquid metal, or another liquid, depending upon the particular requirements of the system. The pump 80 can pressurize the heat transfer liquid, which can flow to the heat exchanger 82 (e.g., to the tube side), where it can be heated. In the illustrated embodiment, the heat exchanger 82 (e.g., the shell side of the heat exchanger) can be in fluid communication with the reactor 52 and can receive the product stream 54 from the reactor at elevated temperature (e.g., 400° F. to 900° F.). The high temperature product stream 54 can heat the heat transfer liquid in the heat exchanger 82, and can then flow to the heat exchangers 66 and 68 for cooling and further processing, as described above. In certain embodiments, the heat transfer liquid can be heated to a temperature of 600° F. to 750° F. (315° C. to 400° C.), such as 625° F. to 725° F. (330° C. to 385° C.) in the heat exchanger 82. The heated heat transfer liquid can then flow to the heater 84, where it can be further heated to a temperature of 700° F. to 800° F. (370° C. to 430° C.), before flowing to the shell side of the heat exchanger 38. The heat transfer liquid can heat the biomass slurry stream in the heat exchanger 38, and can then flow to the shell side of the heat exchanger 18, before returning to the pump 80. In certain embodiments, the liquid circuit 11 can include a heater similar to the heater 46 between the heat exchanger 38 and the reactor 52, depending upon the particular requirements of the system.

One or more of the HTL reactor systems described herein can provide significant advantages over known systems. For example, in existing HTL reactor systems the capital cost (e.g., design, materials, construction, installation, etc.) of the heat exchanger for heating the biomass slurry is typically the largest expense of the entire project. Counterintuitively, pressurizing and heating the biomass slurry in multiple steps using multiple pumps and heat exchangers arranged alternatingly in series can reduce the capital cost of such equipment by 75% or more as compared to existing HTL reactor systems with a conventional single step pumping and heating configuration, as is typically implemented in fluid chemical processing and high-pressure sludge processes (e.g., supercritical water oxidation and wet air oxidation). In certain embodiments, this can be due to changes in the size, design, and materials of the pumps and heat exchangers enabled by reduced pressure and temperature operating ranges of the equipment. Pressurizing and heating the biomass slurry in multiple stages can also result in significant efficiency gains.

For example, by pressurizing the biomass slurry to an intermediate pressure below the pressure at which the HTL reaction takes place (e.g., 50% of the reactor pressure or less), the first heat exchanger 18 need only be configured to handle the biomass slurry at these relatively low temperatures and pressures. This can significantly reduce the tube and shell thicknesses required, resulting in a reduction of the tube and shell material quantities by 70% to 95% as compared to existing systems. For example, in a conventional system including a single pump and a single heat exchanger, the heat exchanger can require 607 $ft^3$ of metal material, while two heat exchangers configured as described with reference to FIG. 1 can achieve the same or nearly the same performance, and can comprise 161 $ft^3$ of metal material in total, 26% of the metal material of the heat exchanger in the conventional system.

Systems using a liquid other than the product stream as a heat transfer medium, such as the system of FIG. 6, can achieve even greater material reduction compared to comparable existing systems. For example, the single heat exchanger of a conventional hot oil system can require 838 ft$^3$ of metal material, while a system including two heat exchangers configured as described with reference to FIG. 6 can achieve similar performance using 148 ft$^3$ of metal material total, or less than 20% of the metal volume required for the heat exchanger of the conventional system.

Additionally, due to the lower intermediate pump pressure in the first pumping step, the size of the high-performance slurry pump 14 can be reduced as compared to existing systems. This can result in significant cost savings and increased pumping efficiency. Additionally, although the biomass slurry is relatively viscous when it enters the first heat exchanger 18, the relatively low pressure of the slurry permits the use of relatively large tube diameters in a laminar flow regime, which contributes to the significantly lower material and construction costs noted above.

The second pump 34 can also offer additional cost savings and efficiency gains. Because the viscosity of the biomass slurry is significantly lower upon exiting the heat exchanger 18, the second pump 34 need only be configured to handle a high temperature, low viscosity liquid (e.g., a Newtonian liquid) instead of a high temperature, highly viscous liquid. Moreover, the pressure gain needed to attain the specified reactor pressure is more modest, resulting in additional cost savings related to pump construction, and increased pumping efficiency. Additionally, since the viscosity of the biomass slurry can be relatively low upon exiting the heat exchanger 18 and/or the second pump 34, the second heat exchanger 38 can be configured to handle a high pressure, low viscosity media, which can contribute to the lower material quantities required to construct the second heat exchanger noted above. The turbulent flow regime achievable with the biomass slurry in the tubes of the heat exchanger 38 can also result in significant improvements in heat transfer.

Figure 7:
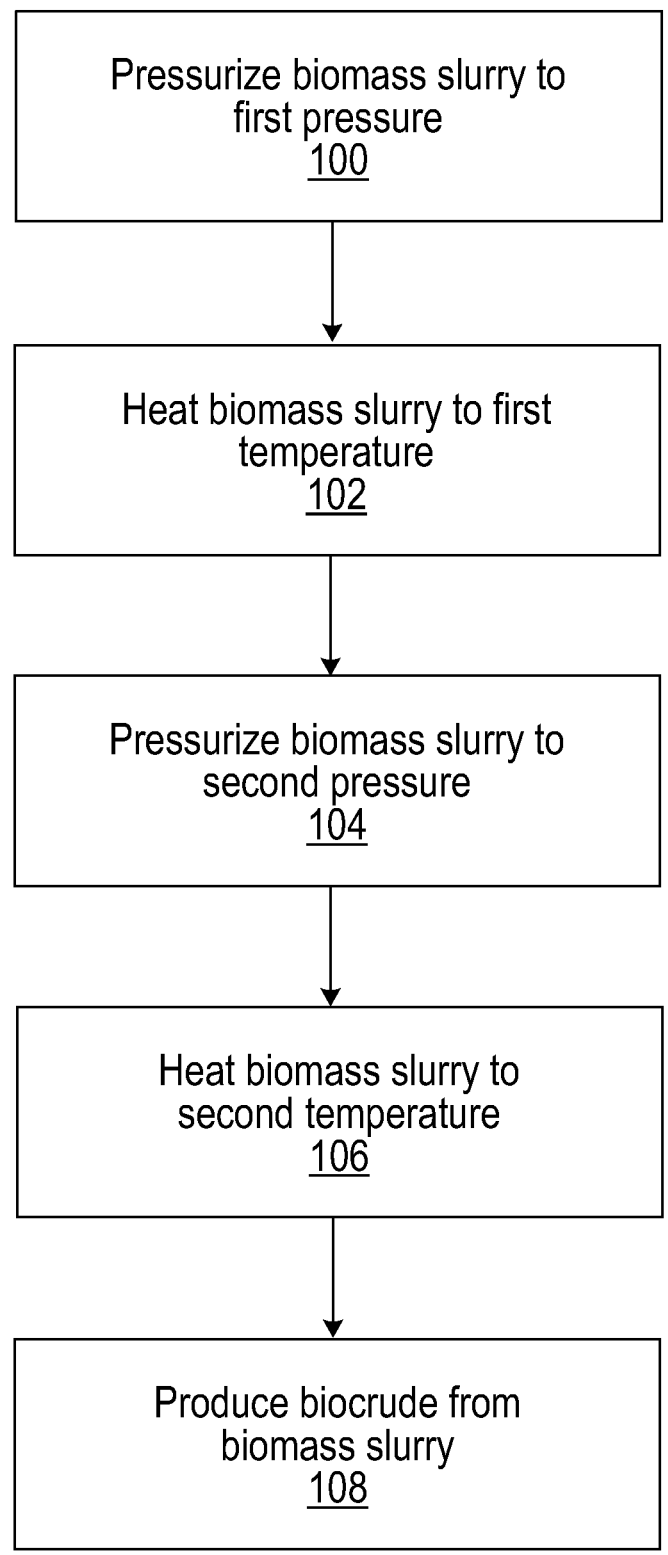
FIG. 7 is a process flow diagram illustrating a method of producing biocrude in a hydrothermal liquefaction reactor system, according to one example.

Referring to FIG. 7, a method of producing biocrude using multiple pressurization and heating steps can comprise pressurizing a biomass slurry stream from a biomass slurry source to a first pressure at block 100, and heating the biomass slurry stream at the first pressure to a first temperature in a first heat exchanger at block 102. The method can further comprise pressurizing the biomass slurry stream at the first temperature to a second pressure that is greater than the first pressure at block 104, and heating the biomass slurry stream at the second pressure to a second temperature that is greater than the first temperature in a second heat exchanger at block 106. The method can further comprise producing biocrude from the biomass slurry stream at block 108.

Although the heat exchangers 18 and 38 are shown and described herein as separate structures, in practice the heat exchangers can be incorporated into a single piece of machinery with the pump 34 interposed at a suitable location, or can be separate, depending upon the particular requirements of the system.

In certain embodiments, any or all of the pump 14, the heat exchanger 18, the pump 34, the heat exchanger 38, and/or the reactor 52 can comprise multiple units arranged in parallel, depending upon the flow rate of the system. Any of the systems described herein can also include more than two pumping steps (such as three pumping steps, four pumping steps, five pumping steps, etc.), and/or more than two heating steps (such as three heating steps, four heating steps, five heating steps, etc.), and such pumping and heating steps may be alternating as described above, or provided in any other sequence.

In certain examples, there can be a pressure let down valve 35 between the heat exchanger 38 and the heat exchanger 18. The pressure let down valve 35 can reduce the pressure of the product mixture stream exiting the heat exchanger 38 before it flows through the heat exchanger 18. In certain examples, the pressure let down valve 35 can reduce the pressure of the product mixture stream so that it is equal to or substantially equal to (e.g., within ±40%, such as within ±25% or ±10%) the first pressure of the incoming biomass slurry feed stream. In certain examples, this can facilitate a reduction in the shell thickness of the first heat exchange 18, reducing the overall metal material quantities required. In certain examples, there can be another pressure let down valve 65 downstream of the heat exchanger 18 which can further reduce the pressure of the product mixture stream before it flows through the heat exchanger 66. Further details regarding the systems and methods described above can be found in U.S. Pat. No. 11,279,882, which is incorporated herein by reference in its entirety.

Example 2: Hydrothermal Liquefaction System with Series-Parallel Heat Exchanger Network FIGS. 8A-8D illustrates another example of a hydrothermal liquefaction system 200. The system 200 includes a plurality of pumps and heat exchangers configured to pressurize and heat a biomass slurry (or other feed material) to a specified reactor temperature and pressure in a series of alternating pumping and heating steps as in the examples described above. The heat exchangers can be arranged in groups referred to hereinafter as heat exchanger networks. Each heat exchanger network can comprise a plurality of heat exchangers in series, in parallel, and/or in a plurality of parallel flow paths wherein each parallel flow path comprises a plurality of heat exchangers in series (also referred to as a "string" or a "series-parallel" arrangement). A separate flow circuit including a heat transfer liquid can be provided to recover heat from the hot product stream from the HTL reactor and use it to heat the incoming biomass slurry feed stream.

For example, in the illustrated configuration the system 200 can comprise two overall flow paths including a first flow path for the biomass slurry stream (and the product mixture stream after processing in the HTL reactor) referred to hereinafter as the biomass slurry flow path 202. The second flow path can be for a heat transfer liquid and is referred to hereinafter as a heat transfer liquid circuit 204. The heat transfer liquid circuit 204 can be used to recover heat from the product mixture stream for use in heating the incoming biomass slurry feed stream in the first flow path 202.

Referring to FIG. 8A, the system 200 can comprise a biomass slurry source 206, a first plurality of pumps including two pumps 208 and 210 downstream of the biomass slurry source 206, a first heat exchanger network 212, a second plurality of pumps including two pumps 214 and 216 downstream of the first heat exchanger network 212, a second heat exchanger network 218 downstream of the second plurality of pumps, a HTL reactor 220 downstream of the second heat exchanger network 218, a third heat exchanger network 222 downstream of the HTL reactor 220, and a pressure letdown station 224 (e.g., one or a series of valves) and a product cooler 226 downstream of the third heat exchanger network 222. In certain examples, any or all of the above components can be part of the biomass slurry flow path 202.

In any or all of the examples described herein, the biomass slurry can be an aqueous mixture comprising 15% to 40% materials solids, such as 15% to 30% materials solids, 20% to 30% materials solids, 25% materials solids, etc., by mass, in water.

Turning to the biomass slurry flow path 202 in greater detail, the pumps 208 and 210 can be arranged in parallel (e.g., the inlets of the pumps 208 and 210 can be in fluid communication with a common inlet header, inflow channel, plenum, etc., and the outlets can be in fluid communication with a common outlet header, plenum, outflow channel, etc.). The pumps 208 and 210 can be positive displacement pumps such as any of the positive displacement pumps described herein, although in other embodiments the pumps 208 and 210 can be centrifugal pumps or any other type of pump according to the particular specifications of the system. A surge tank or other feature can provide pressure pulse damping to the pressurized biomass slurry outflow stream from the pumps 208 and 210.

The first heat exchanger network 212 can be downstream of the pumps 208 and 210. The first heat exchanger network 212 can comprise a plurality of heat exchangers 228. Each of the heat exchangers 228 can comprise a "cold side" (also referred to as a "cold flow side") defining a flow path or paths for the biomass slurry stream to be heated. The liquid stream to be heated (e.g., the biomass slurry stream in the first heat exchanger network 212) is also referred to herein as the "cold stream". Thus, the cold sides of the heat exchangers 228 can form a part of the biomass slurry flow path 202. Each of the heat exchangers 228 can also include a "hot side" (also referred to as a "hot flow side") defining a flow path or paths for the heat transfer liquid (also referred to as a "hot stream") that heats the biomass slurry stream on the cold side of the heat exchanger. Thus, the hot sides of the heat exchangers 228 can form part of the heat transfer liquid circuit 204.

In the illustrated example, the heat exchangers 228 are shell and tube heat exchangers such as described above, in which the tubes of the heat exchangers form the "cold sides" configured to receive the biomass slurry stream to be heated and the shells are the "hot sides" configured to receive the heat transfer liquid stream circulating in the heat transfer liquid circuit 204. However, any or all of the heat exchangers 228 can comprise other types of heat exchangers, such as double-pipe heat exchangers, counter flow heat exchangers, plate heat exchangers, helical coil heat exchangers, spiral heat exchangers, etc., in any combination.

The heat exchangers 228 of the first heat exchanger network 212 can be arranged in a plurality of parallel flow paths, wherein each parallel flow path comprises a plurality of heat exchangers 228 coupled together in series. For example, in FIG. 8B the first heat exchanger network 212 can comprise two parallel arrangements 230 and 232 (also referred to as heat exchanger banks, trains, strings or sub-networks) of heat exchangers 228 coupled in series. The first heat exchanger string 230 can comprise eight heat exchangers 228A-228H. The tube sides (e.g., the cold sides) of the heat exchangers 228A-228H can be in fluid communication so as to provide a continuous flow path for biomass slurry through the first heat exchanger string 230. The shell sides (e.g., the hot sides) of the heat exchangers 228A-228H can be in fluid communication so as to provide a continuous flow path for heat transfer liquid flowing through the first heat exchanger string 230.

The second heat exchanger string 232 can also comprise eight heat exchangers 228I-228P. The tube sides of the heat exchangers 228I-228P can be in fluid communication with each other, and the shell sides of the heat exchangers 228I-228P can be in fluid communication similar to the first heat exchanger string 230.

The cold sides of the first heat exchanger string 230 and the second heat exchanger string 232 can be in fluid communication with a common inlet header 236. For example, the tube side of the heat exchanger 228A and the tube side of the heat exchanger 228I can be coupled to the inlet header 236. Biomass slurry can exit the first heat exchanger string 230 into a common outlet header 238 (e.g., via the heat exchanger 228H). Biomass slurry can also exit the second heat exchanger string 232 into the common outlet header 238 (e.g., via the heat exchanger 228P).

The hot sides of the heat exchanger strings 230 and 232 can also be in fluid communication with common inlet and outlet headers, which can be part of the heat transfer liquid circuit 204. For example, the hot side of the heat exchanger 228H of the first heat exchanger string 230 and the hot side of the heat exchanger 228P of the heat exchanger string 232 can each be in fluid communication with a common inlet header 240. The hot side of the heat exchanger 228A of the first heat exchanger string 230 and the hot side of the heat exchanger 228I of the heat exchanger string 232 can each be in fluid communication with a common outlet header 242.

The second plurality of pumps 214 and 216 can be downstream of the first heat exchanger network 212, as described above. The pumps 214 and 216 (also referred to as "second pumps") can be arranged in parallel. The pumps 214 and 216 can also be positive displacement pumps, although they may also comprise other types of pumps. One or both of the second pumps can also comprise multiple pumps arranged in series.

Figure 8B:
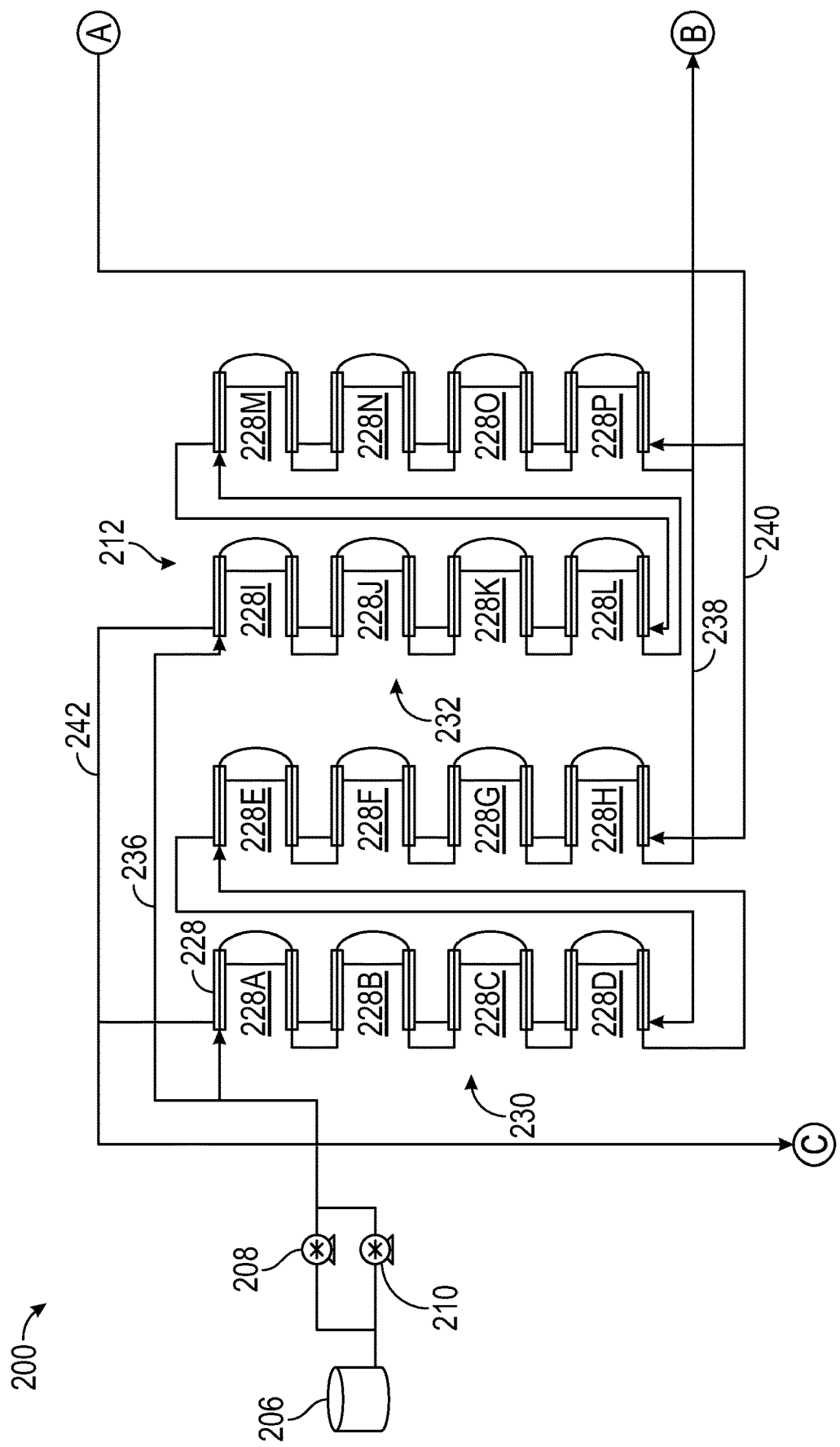
FIGS. 8B-8D are schematic block diagrams detailing portions of the system of FIG. 8A.
Figure 8C:
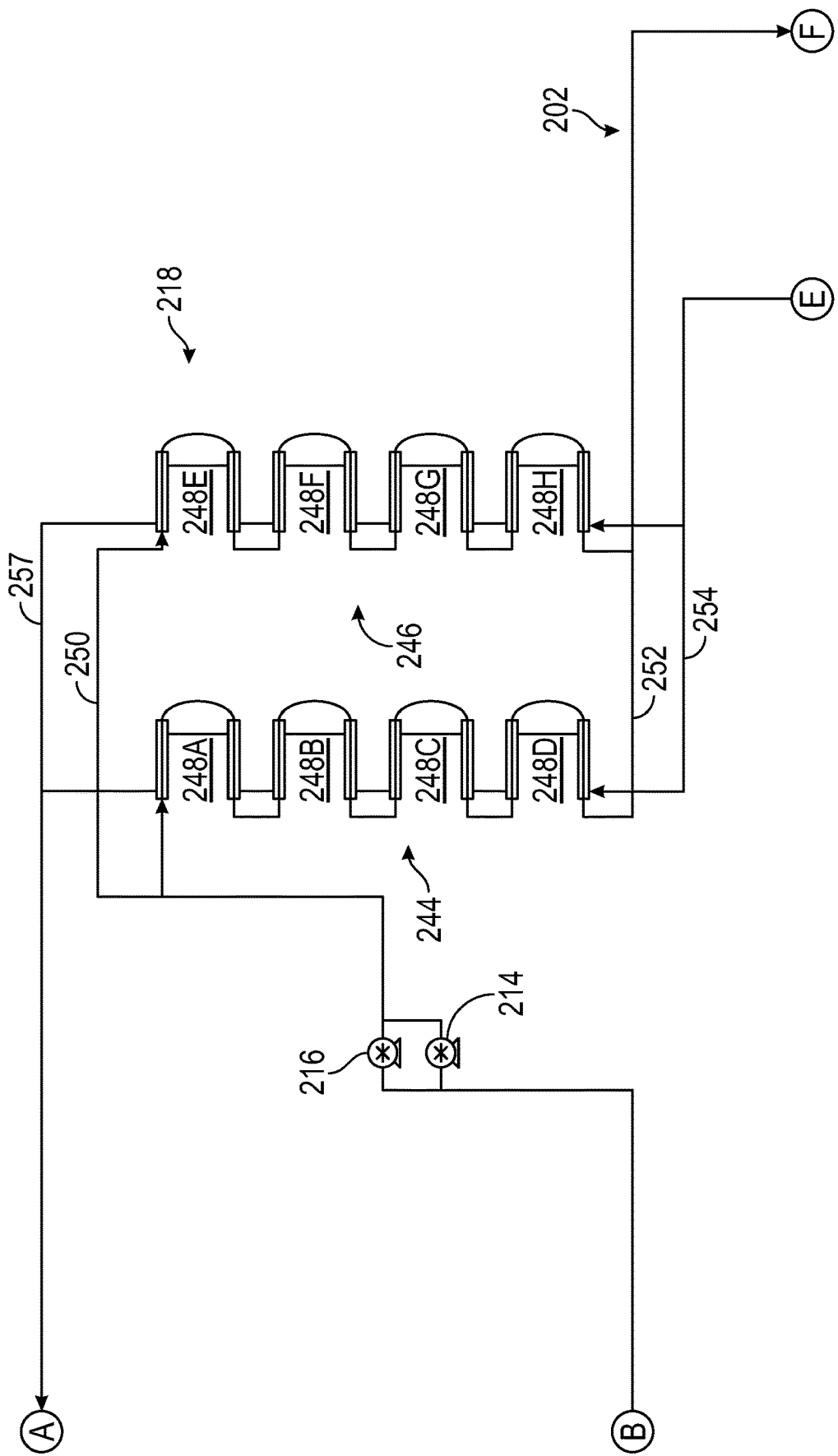

The second heat exchanger network 218 can be downstream of the second pumps 214 and 216. Referring to FIGS. 8A and 8C, the second heat exchanger network 218 can comprise two parallel arrangements/strings 244 and 246 of heat exchangers 248 coupled together in series. The first heat exchanger string 244 can comprise four heat exchangers 248A-248D. The tube sides (e.g., the cold sides) of the heat exchangers 248A-248D can be in fluid communication to provide a continuous flow path for biomass slurry flowing through the heat exchanger string 244, and the shell sides (e.g., the hot sides) of the heat exchangers 248A-248D can be in fluid communication to provide a continuous flow path for heat transfer liquid flowing through the first heat exchanger string 244.

The second heat exchanger string 246 can also comprise four heat exchangers 248E-248H. The tube sides of the heat exchangers 248E-248H can be in fluid communication with each other, and the shell sides of the heat exchangers 248E-248H can be in fluid communication similar to the first heat exchanger string 244.

As with the first heat exchanger network 212, the cold sides of the first heat exchanger string 244 and the second heat exchanger string 246 of the second heat exchanger network 218 can be in fluid communication with a common inlet header 250. For example, the tube side of the heat exchanger 248A and the tube side of the heat exchanger 248E can be coupled to the inlet header 250. Biomass slurry can exit the first heat exchanger string 244 into a common outlet header 252 (e.g., via the heat exchanger 248D). Biomass slurry can also exit the second heat exchanger string 246 into the common outlet header 252 (e.g., via the heat exchanger 248H).

The hot sides of the heat exchanger strings 244 and 246 can also be in fluid communication with common inlet and outlet headers. For example, the hot side of the heat exchanger 248D of the first heat exchanger string 244 and the hot side of the heat exchanger 248H of the second heat exchanger string 246 can each be in fluid communication with a common inlet header 254. The hot side of the heat exchanger 248A of the first heat exchanger string 244 and the hot side of the heat exchanger 248E of the second heat exchanger string 246 can each be in fluid communication with a common outlet header 257.

The HTL reactor 220 can be downstream of the second heat exchanger network 218 along the biomass slurry flow path 202. The HTL reactor 220 can convert biomass in the biomass slurry stream into biocrude oil and other reaction products, as described above. The outflow stream from the HTL reactor 220 is referred to herein as the product mixture stream.

Figure 8D:
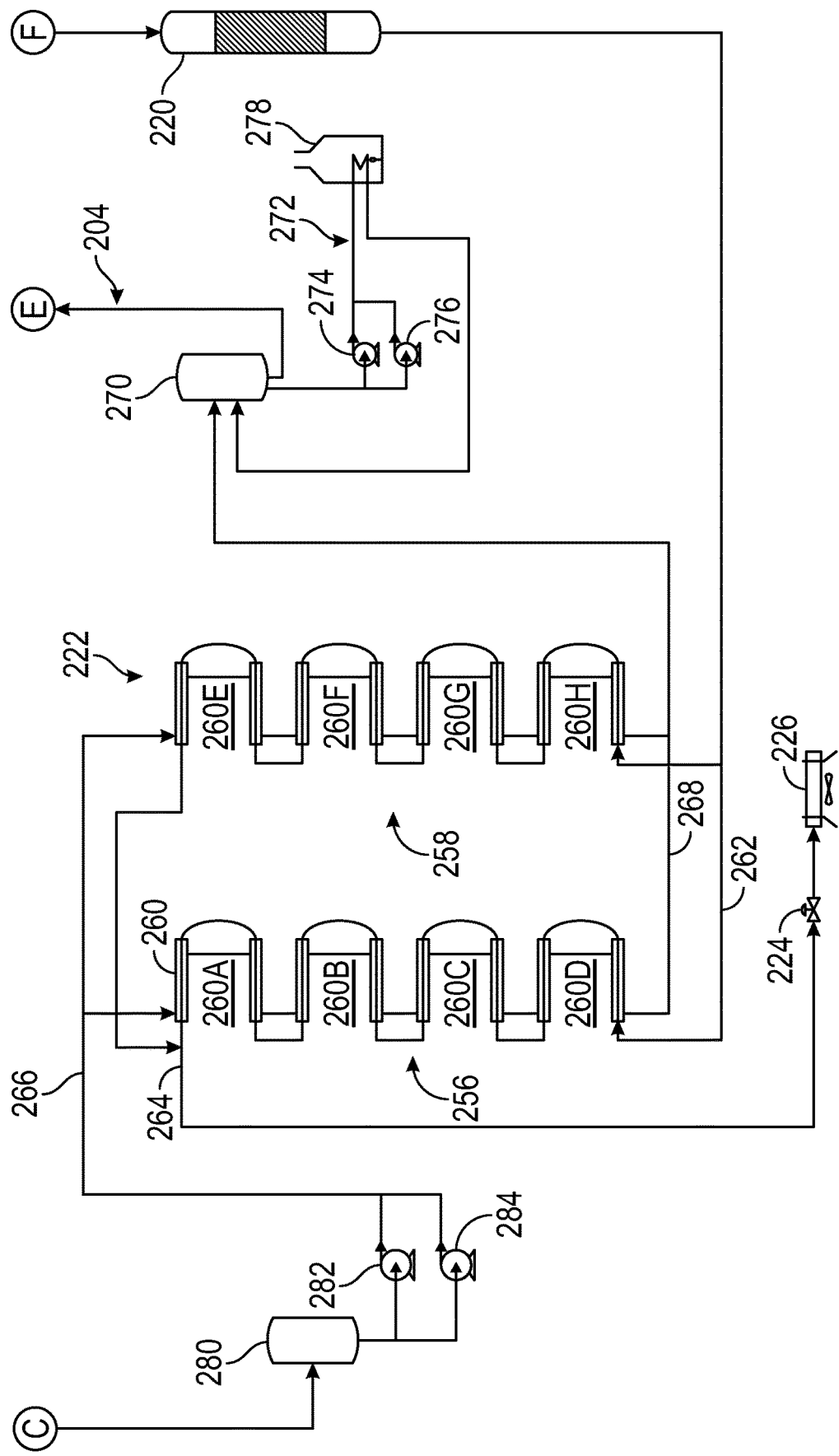

The third heat exchanger network 222 can be downstream of the HTL reactor 220. Referring to FIGS. 8A and 8D, the third heat exchanger network 222 can comprise two parallel arrangements/strings 256 and 258 of heat exchangers 260 coupled together in series. The first heat exchanger string 256 can comprise four heat exchangers 260A-260D. The tube sides (e.g., the hot sides) of the heat exchangers 260A-260D can be in fluid communication to provide a continuous flow path for the product mixture flowing through the heat exchanger string 256, and the shell sides (e.g., the cold sides) of the heat exchangers 260A-260D can be in fluid communication to provide a continuous flow path for heat transfer liquid flowing through the first heat exchanger string 256. Because the product mixture stream is at a higher pressure than the heat transfer liquid, the product mixture stream flows through the tubes of the heat exchangers and the heat transfer liquid flows through the shells, making the tubes the "hot sides" and the shells the "cold sides" of the heat exchangers.

The second heat exchanger string 258 can also comprise four heat exchangers 260E-260H. The tube sides of the heat exchangers 260E-260H can be in fluid communication with each other, and the shell sides of the heat exchangers 260E-260H can be in fluid communication with each other similar to the first heat exchanger string 256.

The hot sides of the first heat exchanger string 256 and the second heat exchanger string 258 of the third heat exchanger network 222 can be in fluid communication with a common inlet header 262. For example, the tube side of the heat exchanger 260D and the tube side of the heat exchanger 260H can be coupled to the inlet header 262 downstream of the HTL reactor 220. The product mixture can exit the first heat exchanger string 256 into a common outlet header 264 (e.g., via the heat exchanger 260A). Product mixture can also exit the second heat exchanger string 258 into the common outlet header 264 (e.g., via the heat exchanger 260E).

The cold sides (e.g., the shell sides) of the heat exchanger strings 256 and 258 can also be in fluid communication with common inlet and outlet headers. For example, the cold side of the heat exchanger 260A of the first heat exchanger string 256 and the cold side of the heat exchanger 260E of the second heat exchanger string 258 can each be in fluid communication with a common inlet header 266. The cold side of the heat exchanger 260D of the first heat exchanger string 256 and the cold side of the heat exchanger 260H of the second heat exchanger string 258 can each be in fluid communication with a common outlet header 268. The inlet and outlet headers 266 and 268 can be part of the heat transfer liquid circuit 204.

Downstream of the third heat exchanger network 222, the biomass slurry flow path can further comprise a pressure letdown station 224 and a product cooler 226. The pressure letdown station 224 can be a valve or a plurality of valves that reduce the pressure of the product mixture stream. The product cooler 226 can be one or a plurality of heat exchangers, such as air-to-liquid heat exchangers that further cool the product mixture stream by forced airflow (e.g., using fans). The product cooler 226 can also comprise shell-and-tube or other liquid-to-liquid heat exchangers. The product mixture stream can then proceed to a phase separator and collection, as described above.

In addition to the features described above, the heat transfer liquid circuit 204 can further comprise a first heat transfer liquid reservoir 270. The first heat transfer liquid reservoir 270 can store heated heat transfer liquid received from the third heat exchanger network 222 (e.g., from the outlet header 268. The heat transfer liquid circuit 204 can also comprise a liquid circuit 272 (also referred to as a "heater circuit") comprising parallel centrifugal pumps 274 and 276 in fluid communication with a heater 278 (e.g., an oil heater, gas heater, electric heater, or other heat source). Heat transfer liquid heated by the heater 278 can be returned to the first heat transfer liquid reservoir 270. The heat transfer liquid circuit 204 can extend from the first heat transfer liquid reservoir 270, through the hot sides (e.g., the shell sides) of the heat exchangers 248 of the second heat exchanger network 218, through the hot sides (e.g., the shell sides) of the heat exchangers 228 of the first heat exchanger network 212, and to a second heat transfer liquid reservoir 280. A pair of centrifugal pumps 282 and 284 can be in fluid communication with the second heat transfer liquid reservoir 280, and can pressurize heat transfer liquid from the second heat transfer liquid reservoir 280 and deliver it to the cold sides (e.g., the shells) of the heat exchangers 260 of the third heat exchanger network 222.

In operation, a biomass slurry stream can flow from the biomass slurry source 206 through the pumps 208 and 210. The biomass slurry stream can be at ambient temperature (e.g., ° F. to 80° F. (4° C. to 27° C.), such as 61° F. (16° C.). The pumps 208 and 210 can pressurize the biomass slurry stream to a first pressure of, for example, 500 psig to 1,500 psig (35 bar to 104 bar), such as 700 psig to 1,300 psig (48 bar to 90 bar), 740 psig to 1250 psig (51 bar to 86 bar), 800 psig to 1,100 psig (55 bar to 76 bar), 985 psig (68 bar), etc. In certain examples, the biomass slurry flow path 202 can comprise features for pressure pulse damping downstream of the pumps 208 and 210 such as surge drums, tanks, valves, etc. In a particular example, the total flow through the pumps 208 and 210 can be 45.1 klb/hr (20,460 kg/hr).

The pressurized biomass slurry stream can flow through the first heat exchanger network 212, where the biomass slurry stream can be heated to a first temperature of 400° F. to 700° F. (200° C. to 370° C.), such as 450° F. to 650° F. (230° C. to 345° C.), 400° F. to 600° F. (200° C. to 316° C.), 571° F. (300° C.), or 500° F. (260° C.). In certain examples, the first temperature can be selected such that the viscosity of the biomass slurry stream is reduced to a viscosity at or below which flow of the biomass slurry stream through the cold sides of the heat exchangers is turbulent as described elsewhere herein (e.g., a viscosity of 0.3 pa·s or less).

In the illustrated example, the biomass slurry stream can be divided between the heat exchanger strings 230 and 232. The temperature difference $\Delta T$ between the inlet and outlet of each of the heat exchangers 228 can be 10° F. (5.6° C.) to 150° F. (83° C.), such as 10° F. (5.6° C.) to 100° F. (56° C.), 20° F. to 80° F. (11° C. to 45° C.), etc. In one example, DP/DT in the tubes of the heat exchangers 228 can be 1,224 psig/571° F. (84 bar/300° C.). The tubes can comprise stainless steel, such as SAE 316L stainless. In a particular example, the first heat exchanger network 212 can have a total duty of 20.1 mmbtu/hr, and can comprise a heat transfer surface area (e.g., a tube surface area) of 19,329 ft$^2$. In certain examples, the shell design pressure and design temperature (DP/DT) can be 200 psig/616° F. In one example, the shells of the heat exchangers 228 can comprise ASTM A106 carbon steel.

In certain examples, the biomass flow path 202 can comprise any or all of a surge drum, level control, and/or pump discharge spillback valve downstream of the first heat exchanger network 212 and/or downstream of the second pumps 214 and 216 (e.g., as in FIG. 9).

The second pumps 214 and 216 can pressurize the biomass slurry stream received from the first heat exchanger network 212 to a second pressure that is greater than the first pressure. For example, the second pumps 214 and 216 can pressurize the biomass slurry stream to a second pressure of 2,000 psig to 4,000 psig (138 bar to 276 bar), such as 2,500 psig to 3,500 psig (172 bar to 242 bar), 3,050 psig (211 bar), etc. After pressurization to the second pressure, the temperature of the biomass slurry stream can be 475° F. to 550° F. (246° C. to 288° C.), such as 513° F. (267° C.). The biomass slurry flow path can also include pressure pulse damping features downstream of the second pumps 214 and 216.

The biomass slurry stream at the second pressure can flow to the second heat exchanger network 218, where the biomass slurry stream can be heated to a second temperature of 500° F. to 800° F. (260° C. to 427° C.), such as 550° F. to 750° F. (287° C. to 400° C.), 550° F. to 700° F. (287° C. to 371° C.), 600° F. to 700° F. (315° C. to 371° C.), 650° F. (343° C.), 656° F. (347° C.), etc. In certain examples the tube design pressure and design temperature (DP/DT) of the heat exchangers 248 can be 3,360 psig/710° F. (231 bar/377° C.), and the tube material can be stainless steel such as SAE 316L stainless steel. In certain examples, the shells of the heat exchangers 248 can comprise ASTM A106 carbon steel. In certain examples, the shell DP/DT can be 300 psig/760° F. (21 bar/405° C.). In certain examples, the second heat exchanger network 218 can have a total duty of 8.9 mmbtu/hr with an effective heat transfer surface area of 8,921 ft$^2$.

Biomass slurry at the second temperature and the second pressure can flow from the second heat exchanger network 218 to the HTL reactor 220, where it can be converted to biocrude and other reaction products. The product mixture stream can exit the HTL reactor 220 and flow to the hot side of the third heat exchanger network 222 where it can heat the heat transfer liquid. The product mixture stream can flow to the third heat exchanger network 222 at a third temperature of 500° F. to 800° F. (260° C. to 427° C.), such as 550° F. to 750° F. (287° C. to 400° C.), 550° F. to 700° F. (287° C. to 371° C.), 600° F. to 700° F. (315° C. to 371° C.), 650° F. (343° C.), 656° F. (347° C.), 654° F. (345° C.), etc., and a third pressure of 2,000 psig to 4,000 psig (138 bar to 276 bar), such as 2,500 psig to 3,500 psig (172 bar to 242 bar), 2,500 psig to 3,000 psig (172 bar to 207 bar), 2885 psig (157.5 bar), etc. In certain embodiments, the HTL process can be a constant temperature process and the temperature of the product mixture stream flowing out of the reactor can be the same or substantially the same as the temperature of the incoming biomass slurry stream.

In certain examples, in the tubes of the heat exchangers 260 of the third heat exchanger network 222 the ratio DP/DT can be 3,180 psig/710° F. (219 bar/377° C.). In certain examples, the tubes can comprise SAE 316L stainless steel. In certain examples, the shell DP/DT can be 190 psig/690° F. (13 bar/366° C.). In certain examples, the shells can comprise ASTM A106 carbon steel. In certain examples, the total duty of the third heat exchanger network 222 can be 22.4 mmbtu/hr, and in certain examples the third heat exchanger network 222 can have an effective heat transfer surface area of 8,921 ft$^2$.

The product mixture stream can flow out of the third heat exchanger network 222 at a fourth pressure of 2,000 psig to 4,000 psig (138 bar to 276 bar), such as 2,500 psig to 3,500 psig (172 bar to 242 bar), 2,500 psig to 3,000 psig (172 bar to 207 bar), 2,840 psig (196 bar), etc. The product mixture stream can have a fourth temperature of 150° F. to 400° F. (65° C. to 205° C.), such as 200° F. to 300° F. (93° C. to 149° C.) or 246° F. (119° C.), and a flow rate of 39.5 klb/hr (17917 kg/hr) in certain examples. The product mixture stream can then flow to the let down station 224 and the cooling station 226.

Turning to the heat transfer liquid circuit 204, the first heat transfer liquid reservoir 270 can contain a heat transfer liquid (e.g., a thermally stable organic liquid such as DOW-THERM™) at a first heat transfer liquid pressure. In certain examples, the first heat transfer liquid pressure can be 100 psig to 300 psig (6 bar to 21 bar), such as 100 psig to 200 psig (6 bar to 14 bar), 120 psig to 210 psig (8 bar to 15 bar), 150 psig to 200 psig (10 bar to 14 bar), 155 psig (10.7 bar), etc. The heat transfer liquid can be circulated through the heater 278 by the pumps 274 and 276, where it can be heated to a first heat transfer liquid temperature of 550° F. to 850° F. (287° C. to 455° C.), such as 600° F. to 800° F. (315° C. to 427° C.), 700° F. (371° C.), etc.

Heat transfer liquid at the first heat transfer liquid temperature and pressure can flow from the first heat transfer liquid reservoir 270 to the second heat exchanger network 218, where it can flow through the hot sides of the heat exchangers 248 to heat the biomass slurry stream to the second temperature. This can reduce the temperature of the heat transfer liquid to a second heat transfer liquid temperature of 450° F. to 650° F. (232° C. to 343° C.), such as 500° F. to 600° F. (260° C. to 316° C.), 550° F. (288° C.), 545° F. (285° C.), etc. The heat transfer liquid can then flow to the first heat exchanger network 212, where it can flow through the hot sides of the heat exchangers 228 to heat the biomass slurry stream to the first temperature. This can reduce the temperature of the heat transfer liquid to a third heat transfer liquid temperature of 80° F. to 200° F. (26° C. to 94° C.), such as 100° F. to 200° F. (37° C. to 94° C.), 100° F. to 180° F. (37° C. to 82° C.), 100° F. to 150° F. (37° C. to 66° C.), 138° F. (59° C.), etc. At the outlet of the first heat exchanger network 212, the pressure of the heat transfer liquid can be 80 psig to 150 psig (5 bar to 10 bar), such as 100 psig to 150 psig (7 bar to 10 bar), 117 psig (8 bar), etc., (a third heat transfer liquid pressure).

The heat transfer liquid can then flow to the second heat transfer liquid reservoir 280. Heat transfer liquid from the second heat transfer liquid reservoir 280 can be pressurized by the pumps 282 and 284 to a fourth heat transfer liquid pressure of 100 psig to 200 psig (7 bar to 14 bar), such as 150 psig to 200 psig (10 bar to 14 bar), 140 psig to 180 psig (9 bar to 13 bar), 165 psig (11.4 bar), etc. The heat transfer liquid can then flow into the cold sides of the heat exchangers 260 of the third heat exchanger network 222, where it can be heated to a fourth heat transfer liquid temperature of 500° F. to 800° F. (260° C. to 427° C.), such as 550° F. to 750° F. (287° C. to 400° C.), 600° F. to 700° F. (315° C. to 371° C.), 650° F. (343° C.), 630° F. (332° C.), etc. The pressurized heat transfer liquid at the fourth heat transfer liquid temperature can then flow to the first heat transfer liquid reservoir 270 for further heating and cycling through the heat transfer liquid circuit as described above.

Advantageously, the relatively low-pressure heat transfer liquid circuit can allow the shells of the heat exchangers of the first heat exchanger network and/or the shells of the second heat exchanger network to be less thick than in existing configurations where the liquids to exchange heat are both at high pressure. This can significantly reduce the material quantities required to produce the heat exchangers and reduce the capital cost of the system accordingly.

Example 3: Hydrothermal Liquefaction System with Spiral Heat Exchangers

Figure 9A:
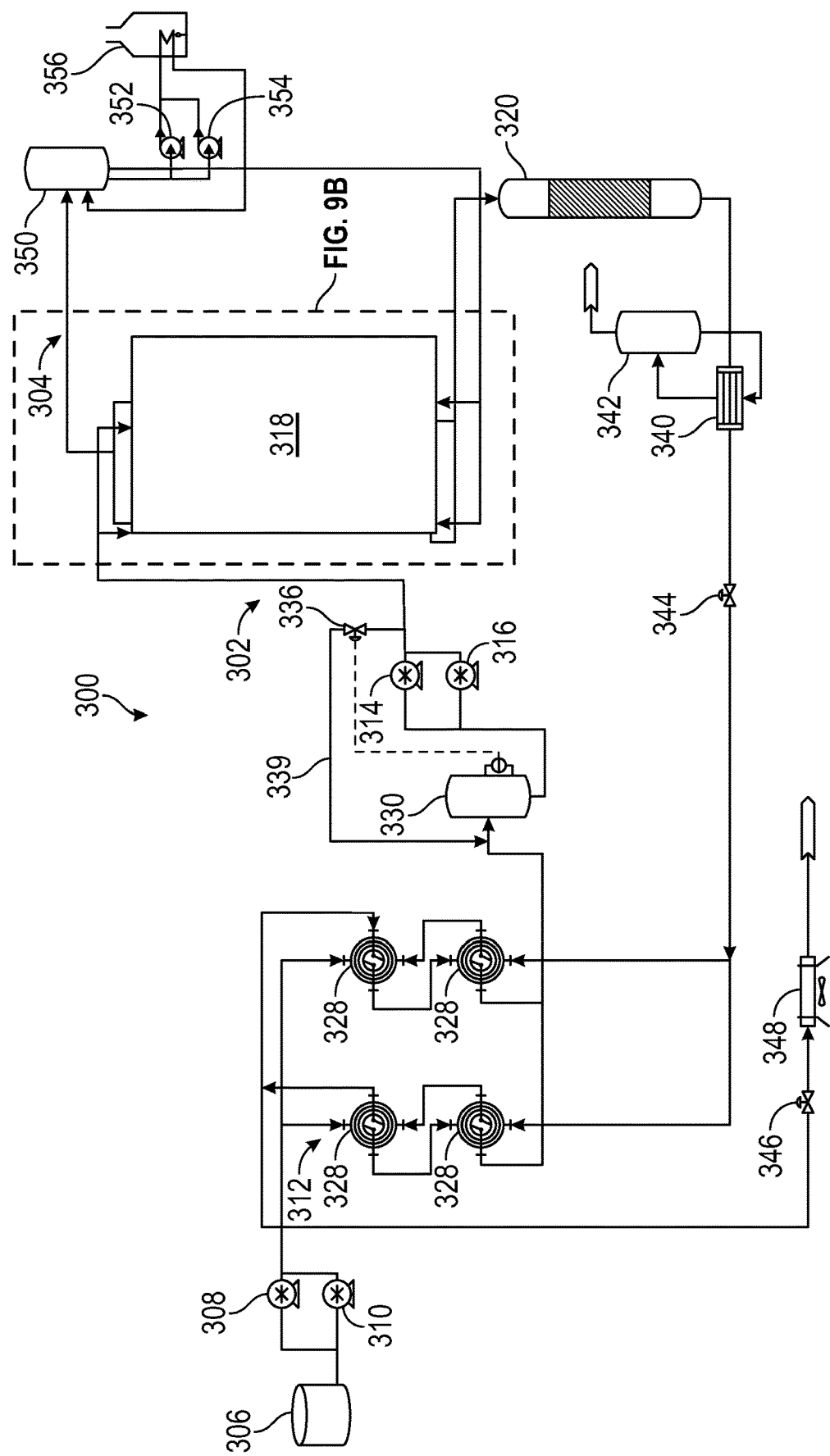
FIGS. 9A-9B are schematic block diagrams illustrating another example of a hydrothermal liquefaction system including a spiral heat exchanger network and a heat transfer liquid circuit.
Figure 9B:
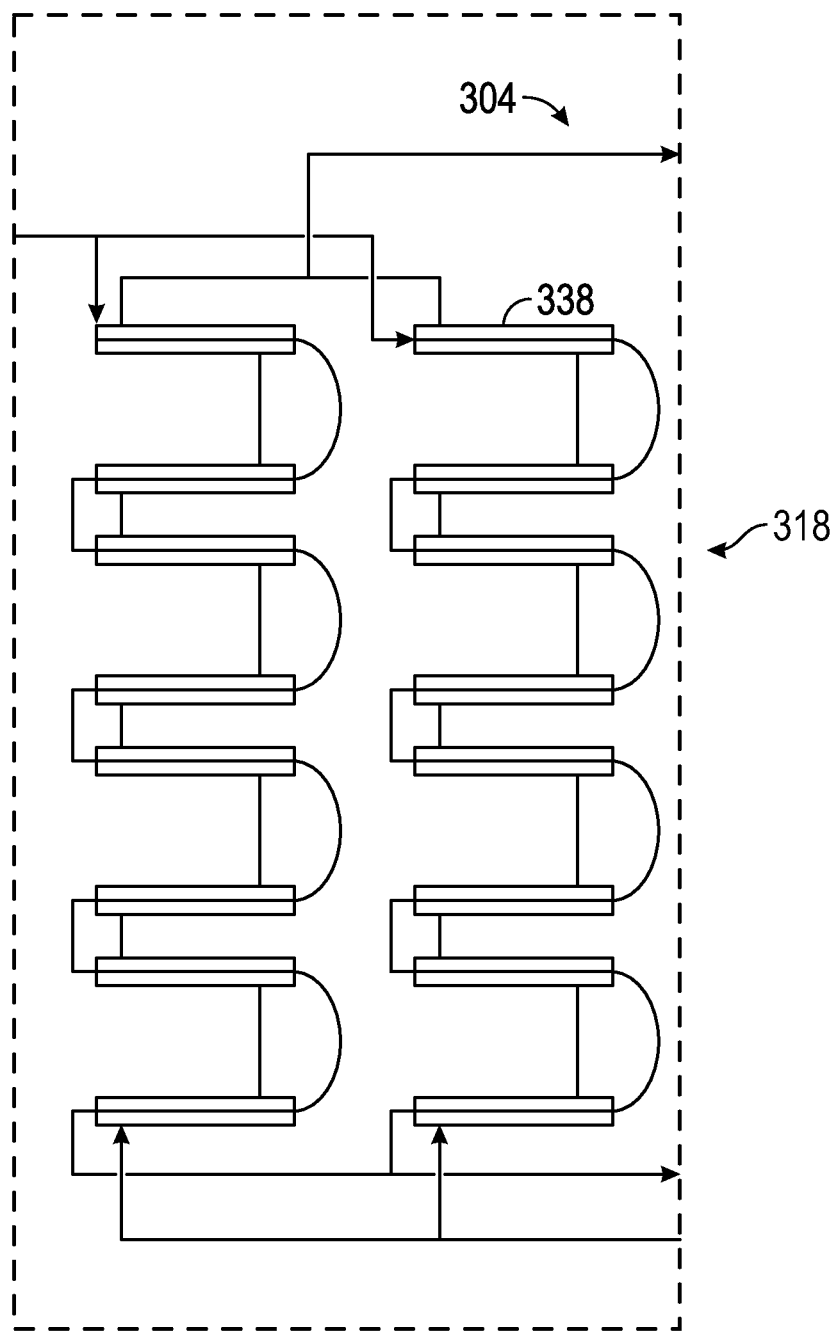

FIGS. 9A-9B illustrate another example of a hydrothermal liquefaction system 300. The system 300 includes a plurality of pumps and heat exchangers configured to pressurize and heat a biomass slurry (or other feed material) to a specified reactor temperature and pressure in a series of alternating pumping and heating steps using a biomass slurry flow path and a heat transfer liquid circuit as in the examples described above.

Referring to FIG. 9A, the system 300 can comprise a biomass slurry flow path generally indicated at 302 and a heat transfer liquid circuit generally indicated at 304. The system can further comprise a biomass slurry source 306, a first plurality of pumps including two pumps 308 and 310 downstream of the biomass slurry source 306, a first heat exchanger network 312, a second plurality of pumps including two pumps 314 and 316 downstream of the first heat exchanger network 312, a second heat exchanger network 318 downstream of the second plurality of pumps, a HTL reactor 320 downstream of the second heat exchanger network 318, and a letdown station and a product cooler downstream of the downstream of the HTL reactor 320. In certain examples, any or all of the above components can be part of the first flow path 302.

Turning to the biomass slurry flow path 302 in greater detail, the pumps 308 and 310 can be positive displacement pumps arranged in parallel as in the example of FIGS. 8A-8D, although in other embodiments the pumps 308 and 310 can be centrifugal pumps or any other type of pump. The first heat exchanger network 312 downstream of the pumps 308 and 310 can comprise a plurality of helical-coil heat exchangers and/or spiral heat exchangers referred to for purposes of this example as spiral heat exchangers 328. The spiral heat exchangers 328 can comprise two flow channels (e.g., a hot flow channel for which another term is a "hot side" and a cold flow channel for which another term is a "cold side") that are coiled around a central axis (e.g., in a counterflow arrangement). The spiral heat exchangers 328 can be arranged in a series-parallel arrangement comprising two parallel strings of spiral heat exchangers, with each string comprising two spiral heat exchangers 328 in series. The cold sides of the spiral heat exchangers 328 can be part of the biomass slurry flow path 302. The hot sides of the spiral heat exchangers 328 can also be part of the biomass slurry flow path 302.

A surge vessel, such as an intermediate pressure surge tank or drum 330 can be located downstream of the first heat exchanger network 312. The surge tank 330 can reduce pressure pulses in the biomass slurry flow path upstream and/or downstream of the surge tank 330. A pump spillback valve 336 can be downstream of the pumps 314 and 316. The spillback valve 336 can be located in a feedback line and/or pipe 339 that feeds back to the biomass slurry flow path upstream of the surge tank 330.

The biomass slurry flow path can continue downstream to the second heat exchanger network 318. Referring to FIGS. 9A and 9B, the second heat exchanger network 318 can comprise a plurality of heat exchangers coupled in a series-parallel arrangement comprising two parallel strings of four heat exchangers 338 coupled in series. In the illustrated embodiment the heat exchangers 338 are shell-and-tube heat exchangers, although the heat exchangers can also be spiral heat exchangers or any other types of heat exchangers including any of the types disclosed herein. The cold sides (e.g., the tubes) of the heat exchangers 338 can be in fluid communication, and can form part of the biomass slurry flow path.

The HTL reactor 320 can be downstream of the second heat exchanger network 318. The HTL reactor 320 can convert the heated, pressurized biomass slurry stream to a product mixture stream including biocrude oil and other reaction products as described elsewhere herein.

The biomass slurry flow path 302 can further comprise a heat exchanger (also referred to as a "product cooler heat exchanger") configured as a waste heat recovery boiler 340 downstream of the HTL reactor 320. The waste heat recovery boiler 340 can be a shell-and-tube heat exchanger, or any other type of heat exchanger described herein. The hot product mixture stream from the HTL reactor 320 can flow through the waste heat recovery boiler 340, which can recover heat from the product mixture stream to generate steam. The steam can be collected in a pressure vessel such as a steam tank or drum 342, from which it can be supplied as hot utility for other processes.

A pressure let down valve 344 can be located downstream of the waste heat recovery boiler 340, and can reduce the pressure of the product mixture stream.

Downstream of the pressure let down valve 344 the product mixture stream can flow through the hot flow channels (also referred to as the hot sides) of the spiral heat exchangers of the first heat exchanger network. The system 300 can thus provide for direct heat exchange between the product mixture stream and the biomass slurry stream. Accordingly, both the cold sides and the hot sides of the heat exchangers 328 of the first heat exchanger network 312 can be part of the biomass slurry flow path 302.

A second pressure let down valve 346 and a cooler (e.g., a rundown cooler or heat exchanger) 348 can be downstream of the hot sides of the heat exchangers 328 of the first heat exchanger network 312.

The heat transfer liquid circuit can comprise a heat transfer liquid reservoir 350 (e.g., a first heat transfer liquid reservoir) containing a heat transfer liquid (e.g., DOWTHERM™ or any of the other heat transfer liquids described herein). One or a plurality of pumps such as pumps 352 and 354 arranged in a parallel arrangement can circulate heat transfer liquid from the heat transfer liquid reservoir 350 to a heater 356 and back to the heat transfer liquid reservoir 350 in a heater circuit. The heater 356 can be an oil heater, a gas heater, an electric heater, or any other kind of heater described herein.

The heat transfer liquid reservoir 350 can be in fluid communication with the hot sides (e.g., the shell sides) of the heat exchangers 338 of the second heat exchanger network 318. The direction of flow of the heat transfer liquid can be counter (e.g., opposite) to the direction of flow of the biomass slurry stream flowing through the tubes of the heat exchangers 338. Upon exiting the second heat exchanger network 318, the heat transfer liquid can return to the heat transfer liquid reservoir 350 for reheating.

In operation, a biomass slurry stream from the biomass slurry source 306 can be pressurized by the pumps 308 and 310 to a first pressure. In certain examples, the first pressure can be 500 psig to 2,000 psig (34 bar to 138 bar), such as 500 psig to 1,500 psig (34 bar to 104 bar), 700 psig to 1,300 psig (48 bar to 90 bar), 740 psig to 1250 psig (51 bar to 86 bar), 800 psig to 1,100 psig (55 bar to 76 bar), 985 psig (68 bar), etc., or any of the other first pressures described herein. The biomass slurry stream can then flow at the first pressure through the first heat exchanger network 312, where the biomass slurry stream can be heated to a first temperature. In certain examples, the first temperature can be 400° F. to 700° F. (200° C. to 370° C.), such as 500° F. to 600° F. (260° C. to 316° C.) or any of the other first temperatures described herein. The biomass slurry stream can be heated to the first temperature in increments or steps in the serial spiral heat exchangers 328.

The biomass slurry stream can then flow through the surge tank 330 to the pumps 314 and 316. The pumps 314 and 316 can pressurize the biomass slurry stream to a second pressure that is greater than the first pressure. For example, in certain examples the pumps 314 and 316 pressurize the biomass slurry stream to a second pressure of 2,000 psig to 4,000 psig (138 bar to 276 bar), such as 2,500 psig to 3,500 psig (172 bar to 242 bar), 3050 psig (210 bar), etc., or any of the other second pressures described herein. The biomass slurry stream at the second pressure can then flow to the second heat exchanger network 318 where it can be heated to a second temperature. The second temperature can be, for example, 500° F. to 800° F. (260° C. to 427° C.), such as 550° F. to 750° F. (287° C. to 400° C.), 550° F. to 700° F. (287° C. to 371° C.), 600° F. to 700° F. (315° C. to 371° C.), 650° F. (343° C.), 656° F. (347° C.), etc., or any of the other second temperatures described herein.

The biomass slurry stream at the second temperature and the second pressure can then flow through the HTL reactor 320, where it can be converted to a product mixture stream including biocrude oil and other reaction products as described above. The product mixture stream can then flow to the waste heat recovery boiler 340, where the temperature of the product mixture stream can be reduced from a temperature of 600° F. to 700° F. (315° C. to 371° C.) to a temperature of 100° F. to 500° F. (37° C. to 260° C.), such as 200° F. to 400° F. (93° C. to 204° C.) by generation of steam. The product mixture stream can then flow to the let down valve 344, where the pressure can be reduced to, for example, a pressure that is within a specified range relative to the first pressure of the incoming biomass slurry stream, such as equal or nearly equal to the first pressure of the biomass slurry stream, for example 700 psig to 1,300 psig (48 bar to bar), such as 740 psig to 1250 psig (51 bar to 86 bar), 800 psig to 1,100 psig (55 bar to 76 bar), 985 psig (68 bar), etc. The product mixture stream can then flow to the hot sides (e.g., the hot flow channels) of the spiral heat exchangers 328 of the first heat exchanger network 312. From the first heat exchanger network 312, the product mixture stream can flow to the pressure let down valve 346, the cooler 348, and on for further processing.

In the heat transfer liquid circuit 304, heat transfer liquid in the heat transfer liquid reservoir 350 can be circulated through the heater 356 by the pumps 352 and 354. The heater 356 can heat the heat transfer liquid and/or maintain the heat transfer liquid at a first heat transfer liquid temperature of, for example, of 550° F. to 850° F. (287° C. to 455° C.), such as 600° F. to 800° F. (315° C. to 427° C.), 700° F. (371° C.), etc., or any of the other first heat transfer liquid temperatures recited herein. The pumps 352 and 354 can also pressurize the heat transfer liquid to a first heat transfer liquid pressure of, for example, 120 psig to 210 psig (8 bar to 15 bar), such as 150 psig to 200 psig (10 bar to 14 bar), 165 psig (11.4 bar), etc., or any of the other first heat transfer liquid pressures recited herein.

Heat transfer liquid at the first heat transfer liquid temperature and the first heat transfer liquid pressure can be supplied from the reservoir 350 through the hot sides (e.g., the shell sides) of the heat exchangers 338 of the second heat exchanger network 318, where the heat transfer liquid can heat the incoming biomass slurry stream to the second temperature. Heat transfer liquid can exit the second heat exchanger network 318 at a second heat transfer liquid temperature of, for example, 400° F. to 700° F. (200° C. to 370° C.), such as 450° F. to 650° F. (232° C. to 344° C.), 550° F. (288° C.), 545° F. (285° C.), etc. The heat transfer liquid can return to the reservoir 350 for reheating and pressurization.

Advantageously, reducing the pressure of the product mixture stream at the pressure let down valve 346 can facilitate pressure matching between the incoming biomass slurry stream and the product mixture stream. The spiral heat exchangers of the first heat exchanger network can thus be designed for hot and cold streams at similar pressures, reducing the wall thickness of the flow channels and the associated material quantities required to produce the heat exchangers while providing for direct heat exchange between the product stream and the incoming feed stream. The configuration of FIGS. 9A-9B can also provide the advantages of lower capital cost, improved ease of maintenance for at least the first heat exchanger network, and relatively low cost of boilers such as the waste heat boiler.

It should be understood that any of the examples herein can include any number of pumps, heat exchangers, pulsation damping features, reservoirs/tanks, etc., in parallel and/or in series, according to the particular requirements of a system. The systems herein can also comprise plural HTL reactors in parallel and/or in series.

Figure 10:
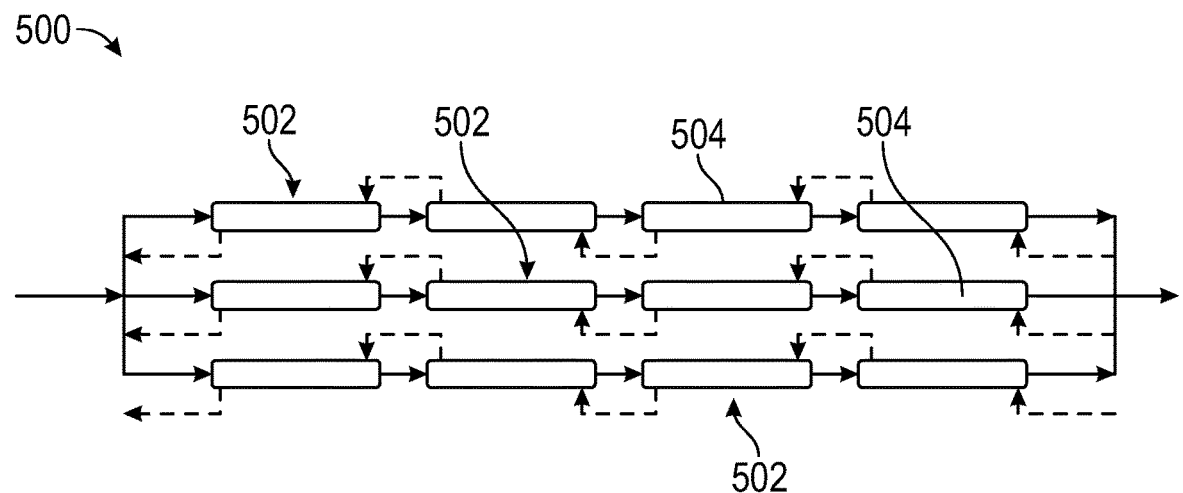
FIGS. 10-11 illustrate heat exchanger network configurations that can be implemented in any of the hydrothermal liquefaction systems described herein.
Figure 11:
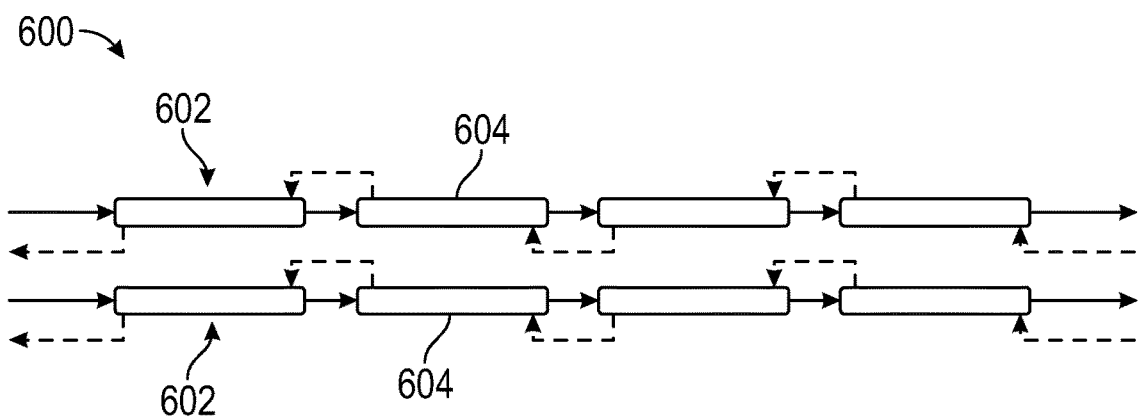

FIGS. 10 and 11 illustrate additional examples of heat exchanger networks that can be used in combination with any of the hydrothermal liquefaction systems described herein. FIG. 10 illustrates a heat exchanger network 500 with parallel strings 502 of heat exchangers 504, wherein each string 502 includes four heat exchangers 504 in series. FIG. 11 illustrates a heat exchanger network 600 with two parallel strings 602 of heat exchangers 604, wherein each string 602 includes four heat exchangers 604 in series. In both FIGS. 10 and 11, the cold streams and the hot streams flow through the heat exchanger networks in opposite directions.

Table 1 below includes simulation data of shell and tube inlet and outlet temperatures for a representative example of a heat exchanger network including 12 heat exchanger shells. In certain examples, the flange rating of heat exchangers and associated equipment for heat exchanger shells 1-5 can be 150 lbs, with the flange rating of equipment increasing for subsequent heat exchanger shells. Thus, in certain examples the heat exchanger shells 1-5 can be downstream of the first pressure increase (e.g., as performed by pumps 308 and 310 in FIG. 9A) and can be designed to a flange rating of 150 lbs. Subsequent heat exchangers such as shells 6-12 can be downstream of the second pressure increase (e.g., as performed by pumps 314 and 316 in FIG. 9A) and can be designed to higher flange ratings according to the temperature and pressure of the operating fluids at each heat exchanger. In certain examples, any or all of the heat exchanger shells 1-5 can be spiral heat exchangers.

TABLE 1

| HX | Shell No. | Shell Inlet (° F.) | Shell Outlet (° F.) | Tube Inlet (° F.) | Tube Outlet (° F.) | Water Press. (psig) | U (btu/hr-F-ft$^2$) |
|---|---|---|---|---|---|---|---|
| 100 | 1 | 218.52 | 177.19 | 99.82 | 141.62 |  | 10.82 |
| 100 | 2 | 260.10 | 218.52 | 141.62 | 185.25 |  | 11.45 |
| 100 | 3 | 301.10 | 260.10 | 185.25 | 229.59 | 6 | 12.08 |
| 100 | 4 | 343.08 | 301.10 | 229.59 | 276.03 | 31 | 13.46 |
| 100 | 5 | 387.05 | 343.08 | 276.03 | 325.44 | 82 | 15.66 |
| 100 | 6 | 437.25 | 387.05 | 325.44 | 382.12 | 185 | 20.38 |
| 100 | 7 | 490.77 | 437.25 | 382.12 | 441.73 | 375 | 25.76 |
| 100 | 8 | 545.40 | 490.77 | 441.73 | 500.00 | 665 | 30.22 |
| 101 | 9 | 575.65 | 541.13 | 513.00 | 549.12 | 1035 | 25.68 |
| 101 | 10 | 609.85 | 575.65 | 549.12 | 582.78 | 1335 | 26.63 |
| 101 | 11 | 648.05 | 609.85 | 582.78 | 617.02 | 1720 | 28.29 |
| 101 | 12 | 700 | 648.05 | 617.02 | 656.01 | 2285 | 31.54 |

An additional advantage of the heat exchanger networks in the examples herein comprising multiple parallel heat exchanger banks/strings is redundancy. This allows a bank of heat exchangers to be taken offline for maintenance while the system continues to operate using the other heat exchanger bank(s). The heat exchanger banks can also provide for counter-current flow between the hot and cold fluids to maximize thermal efficiency and heat transfer.

Referring again to FIG. 9A, in some examples flow through the spillback valve 336 can be controlled to maintain a selected liquid level in the surge drum 330. Controlling flow through the spillback valve 336 to maintain a specified liquid level in the surge drum can provide the capability to compensate for differences in the pumping rate of the first set of pumps 308 and 310 as compared to the second set of pumps 314 and 316.

Still referring to FIG. 9A, the target pressure of the product stream after the letdown valve 344 can be set according to the water vapor pressure. Maintaining the pressure above a selected threshold can avoid forming steam, which can cause equipment erosion problems downstream. In certain examples, the waste heat recovery boiler 340 can help cool the product stream to avoid steam formation at the letdown valve 344.

In certain examples the pressure letdown valves 344 and 346 can be controlled to maintain selected pressures upstream of the respective valves. For example, the letdown valve 344 can be controlled to maintain upstream backpressure at the selected reactor pressure. Let down valve 346 can be controlled to maintain backpressure upstream of the valve 346 at a pressure appropriate for the spiral heat exchangers 328.

Figure 12:
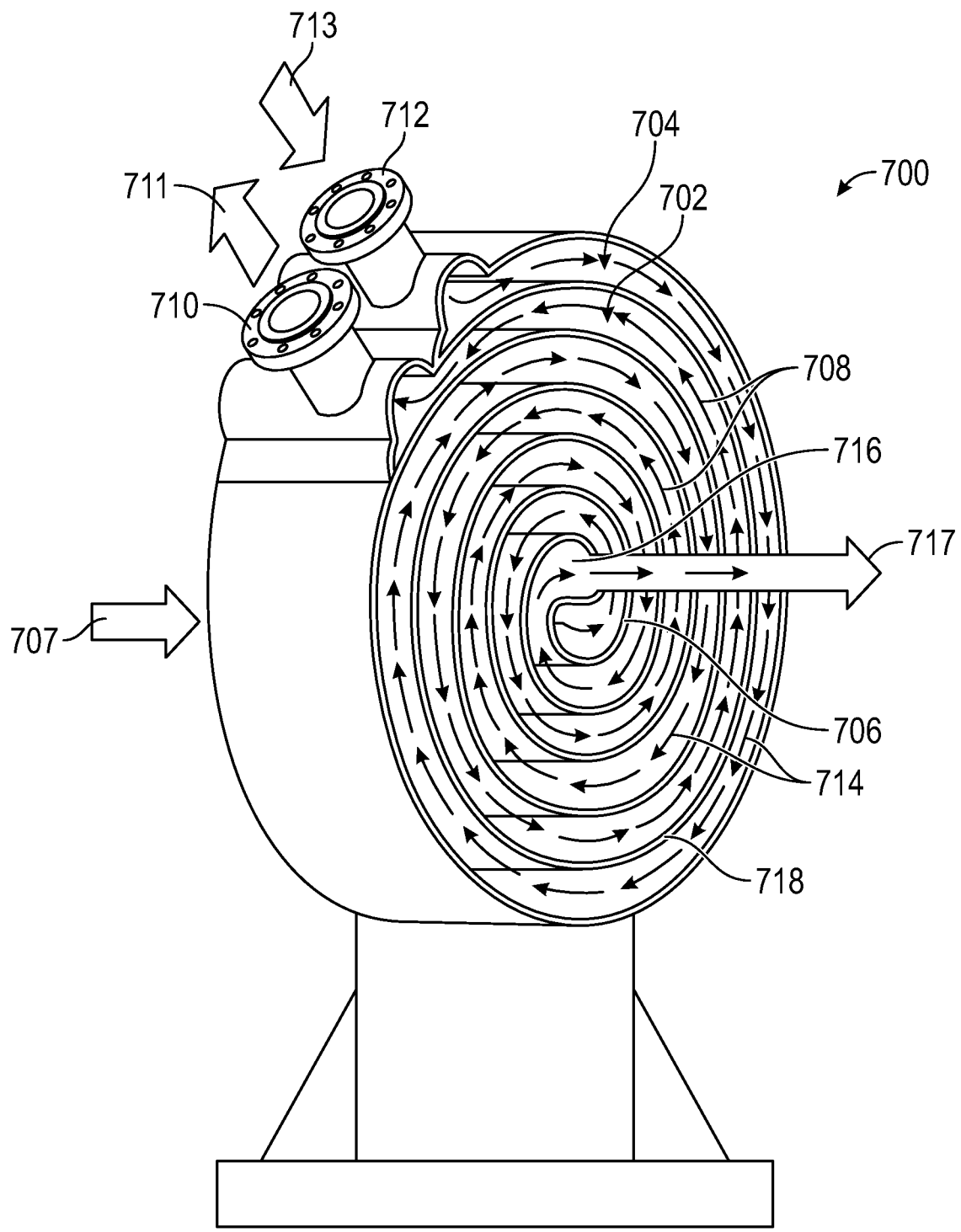
FIG. 12 is a cross-sectional perspective view of an example of a spiral heat exchanger as can be used in combination with any of the hydrothermal liquefaction systems described herein.

Spiral heat exchangers such as the spiral heat exchangers 328 can comprise a pair of coiled, concentric flow channels. The flow channels can be defined by tubes, or by a set of flat sheets that are coiled around a common axis and spaced apart to define two coiled flow channels. Each of the flow channels has a continuous, curved flow path. Inlet and outlet ports are typically at the sides of the assembly and on the ends of the assembly corresponding to the beginning and end of each flow channel. FIG. 12 illustrates a representative example of a spiral heat exchanger 700 comprising a pair of coiled, concentric flow channels 702 and 704. A first fluid (e.g., the hot fluid) can enter the first flow channel 702 through an inlet 706 at the center of the heat exchanger body, as indicated by arrow 707. The hot fluid can flow along the spiral flow channel 702 as indicated by arrows 708 to an outlet 710 on the radially outer surface of the heat exchanger body. The hot fluid can exit through the outlet 710 as indicated by arrow 711. A second fluid (e.g., the cold fluid) can enter the second flow channel 704 through an inlet 712 on the radially outer surface of the heat exchanger body adjacent the outlet 710, as indicated by arrow 713. The cold fluid can flow along the spiral flow channel 704 as indicated by arrows 714 to an outlet 716 at the center of the heat exchanger body, where the cold fluid can exit as indicated by arrow 717. The hot and cold fluids can exchange heat across the continuous wall 718 dividing the first and second flow channels 702 and 704. FIG. 12 illustrates countercurrent flow of the hot and cold fluids through the spiral heat exchanger 700, but the two fluids can also flow through the heat exchanger in the same direction (cocurrent flow) depending on system requirements.

Figure 13:
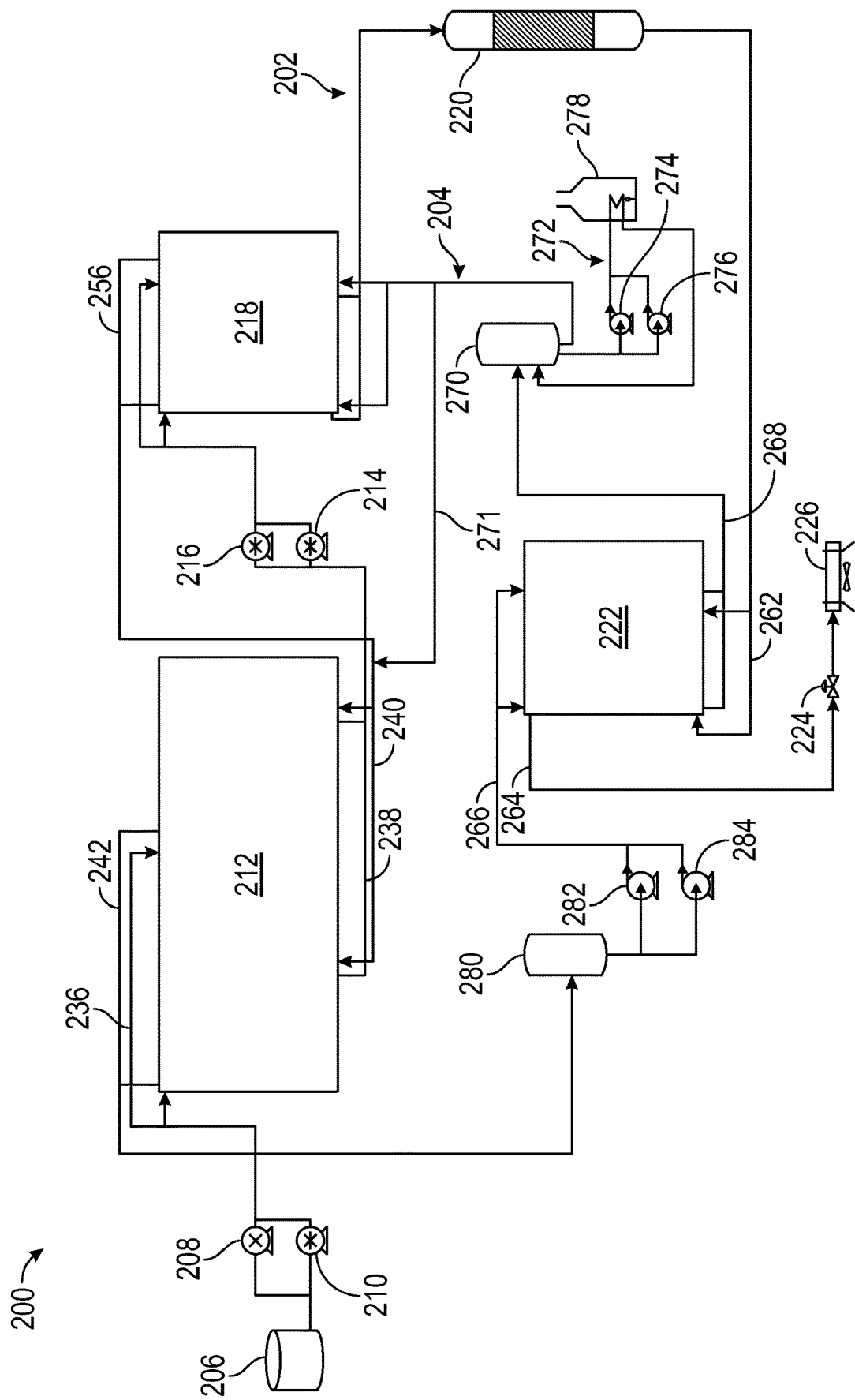
FIG. 13 is a schematic block diagram of the hydrothermal liquefaction system of FIG. 8A including a crossover line in the heat transfer liquid circuit that bypasses the second heat exchanger network.

FIG. 13 illustrates another example of the system 200 of FIG. 8A including a jumpover line 271 (e.g., one or a plurality of pipes or conduits) (also referred to as a "crossover line") in the heat transfer liquid circuit 204 that couples the heat transfer liquid reservoir 270 with the first heat exchanger network 212. In the illustrated example, the jumpover line 271 can extend from a point upstream of the inlet header 254 (FIG. 8C) of the second heat exchanger network 218 to the inlet header 240 of the first heat exchanger network 212. This can allow high temperature heat transfer liquid from the reservoir 270 to be selectively supplied to the hot sides of the first heat exchanger network 212, bypassing the second heat exchanger network 218. This can facilitate temperature control of the heat transfer liquid entering the first heat exchanger network 212 independently of the second heat exchanger network 218. In turn, this can facilitate independent control of the outlet temperature of the biomass slurry from the first heat exchanger network 212 and the second heat exchanger network 218. The jumpover line 271 can include valves, sensors, etc., to control flow and facilitate feedback control. Jumpover lines similar to the jumpover line 271 can also be implemented in any of the other systems described herein to facilitate independent temperature control of the heat transfer liquid in different parts of the heat transfer liquid circuit.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims and equivalents of the recited features. We therefore claim all that comes within the scope and spirit of these claims.

The invention claimed is:

1. A system, comprising:
a biomass slurry flow path, comprising:
a biomass slurry source;
a first pump downstream of the biomass slurry source;
a first heat exchanger network downstream of the first pump, the first heat exchanger network comprising plurality of heat exchangers in a parallel, series, and/or series-parallel flow arrangement, the biomass slurry flow path extending through cold flow sides of the heat exchangers of the first heat exchanger network;
a second pump downstream of the first heat exchanger network;
a second heat exchanger network downstream of the second pump, the second heat exchanger network comprising a plurality of heat exchangers in a parallel, series, and/or series-parallel flow arrangement, the biomass slurry flow path extending through cold flow sides of the heat exchangers of the second heat exchanger network;
a hydrothermal liquefaction (HTL) reactor downstream of the second heat exchanger network;
a third heat exchanger network downstream of the HTL reactor; and
a heat transfer liquid circuit comprising a heat transfer liquid and a heat transfer liquid reservoir; and
wherein heat transfer liquid in the heat transfer liquid circuit flows through cold flow sides of the heat exchangers of the third heat exchanger network, through hot flow sides of the heat exchangers of the second heat exchanger network, and back to the heat transfer liquid reservoir.

2. The system of claim 1, wherein, after flowing through the hot flow sides of the heat exchangers of the second heat exchanger network, heat transfer liquid in the heat transfer liquid circuit flows from the second heat exchanger network through hot flow sides of the heat exchangers of the first heat exchanger network.

3. The system of claim 1, wherein the heat transfer liquid circuit comprises a heater circuit extending from the heat transfer liquid reservoir to a heater and back to the heat transfer liquid reservoir.

4. The system of claim 1, wherein:
the heat transfer liquid reservoir is a first heat transfer liquid reservoir; and
the heat transfer liquid circuit further comprises a second heat transfer liquid reservoir downstream of the first heat exchanger network.

5. The system of claim 1, wherein:
heat transfer liquid in the heat transfer liquid circuit flows from the second heat exchanger network through hot flow sides of the heat exchangers of the first heat exchanger network; and
the heat transfer liquid circuit further comprises a jumpover line coupling the heat transfer liquid reservoir and the first heat exchanger network that bypasses the second heat exchanger network.

6. The system of claim 1, wherein the first heat exchanger network and/or the second heat exchanger network comprise a plurality of heat exchangers arranged in a plurality of parallel heat exchanger strings, wherein each of the parallel heat exchanger strings comprises a plurality of heat exchangers in series.

7. The system of claim 1, wherein the first heat exchanger network comprises spiral heat exchangers.

8. The system of claim 1, wherein the third heat exchanger network receives a product mixture stream from the HTL reactor to heat heat transfer liquid in the heat transfer liquid circuit, and the biomass slurry flow path further comprises a pressure let down valve downstream of the third heat exchanger network to reduce a pressure of a product mixture stream from the third heat exchanger network.

9. The system of claim 8, wherein the biomass slurry flow path further comprises a product cooler heat exchanger downstream of the pressure let down valve to reduce a temperature of a product mixture stream received from the third heat exchanger network.

10. A method, comprising flowing a biomass slurry through the system of claim 1 and producing biocrude oil.

11. A system, comprising:
a biomass slurry flow path, comprising:
a biomass slurry source;
a first pump downstream of the biomass slurry source;
a first heat exchanger network downstream of the first pump, the first heat exchanger network comprising plurality of heat exchangers in a parallel, series, and/or series-parallel flow arrangement, the biomass slurry flow path extending through cold flow sides of the heat exchangers of the first heat exchanger network;
a second pump downstream of the first heat exchanger network;
a second heat exchanger network downstream of the second pump, the second heat exchanger network comprising a plurality of heat exchangers in a parallel, series, and/or series-parallel flow arrangement, the biomass slurry flow path extending through cold flow sides of the heat exchangers of the second heat exchanger network;
a hydrothermal liquefaction (HTL) reactor downstream of the second heat exchanger network;
a third heat exchanger network downstream of the HTL reactor; and
a heat transfer liquid circuit comprising a heat transfer liquid, a heat transfer liquid reservoir, and a heater circuit extending from the heat transfer liquid reservoir to a heater and back to the heat transfer liquid reservoir; and
wherein heat transfer liquid in the heat transfer liquid circuit flows through hot flow sides of the heat exchangers of the second heat exchanger network.

12. The system of claim 11, wherein heat transfer liquid in the heat transfer liquid circuit flows from the second heat exchanger network through hot flow sides of the heat exchangers of the first heat exchanger network.

13. The system of claim 11, wherein heat transfer liquid in the heat transfer liquid circuit flows through cold flow sides of the heat exchangers of the third heat exchanger network and back to the heat transfer liquid reservoir.

14. The system of claim 11, wherein:
the heat transfer liquid reservoir is a first heat transfer liquid reservoir; and
the heat transfer liquid circuit further comprises a second heat transfer liquid reservoir downstream of the first heat exchanger network.

15. The system of claim 11, wherein:
heat transfer liquid in the heat transfer liquid circuit flows from the second heat exchanger network through hot flow sides of the heat exchangers of the first heat exchanger network; and
the heat transfer liquid circuit further comprises a jumpover line coupling the heat transfer liquid reservoir and the first heat exchanger network that bypasses the second heat exchanger network.

16. The system of claim 11, wherein the first heat exchanger network and/or the second heat exchanger network comprise a plurality of heat exchangers arranged in a plurality of parallel heat exchanger strings, wherein each of the parallel heat exchanger strings comprises a plurality of heat exchangers in series.

17. A system, comprising:
a biomass slurry flow path, comprising:
 a biomass slurry source;
 a first pump downstream of the biomass slurry source;
 a first heat exchanger network downstream of the first pump, the first heat exchanger network comprising plurality of heat exchangers in a parallel, series, and/or series-parallel flow arrangement, the biomass slurry flow path extending through cold flow sides of the heat exchangers of the first heat exchanger network;
 a second pump downstream of the first heat exchanger network;
 a second heat exchanger network downstream of the second pump, the second heat exchanger network comprising a plurality of heat exchangers in a parallel, series, and/or series-parallel flow arrangement, the biomass slurry flow path extending through cold flow sides of the heat exchangers of the second heat exchanger network;
 a hydrothermal liquefaction (HTL) reactor downstream of the second heat exchanger network;
 a third heat exchanger network downstream of the HTL reactor; and
a heat transfer liquid circuit comprising a heat transfer liquid and a heat transfer liquid reservoir; and
wherein heat transfer liquid in the heat transfer liquid circuit flows through hot flow sides of the heat exchangers of the second heat exchanger network and through hot flow sides of the heat exchangers of the first heat exchanger network; and
wherein the heat transfer liquid circuit further comprises a jumpover line coupling the heat transfer liquid reservoir and the first heat exchanger network that bypasses the second heat exchanger network.

18. The system of claim 17, wherein heat transfer liquid in the heat transfer liquid circuit flows through cold flow sides of the heat exchangers of the third heat exchanger network and back to the heat transfer liquid reservoir.

19. The system of claim 17, wherein:
the heat transfer liquid reservoir is a first heat transfer liquid reservoir; and
the heat transfer liquid circuit further comprises a second heat transfer liquid reservoir downstream of the first heat exchanger network.

20. The system of claim 17, wherein the first heat exchanger network and/or the second heat exchanger network comprise a plurality of heat exchangers arranged in a plurality of parallel heat exchanger strings, wherein each of the parallel heat exchanger strings comprises a plurality of heat exchangers in series.

21. The system of claim 17, wherein:
the third heat exchanger network receives a product mixture stream from the HTL reactor to heat heat transfer liquid in the heat transfer liquid circuit;
the biomass slurry flow path further comprises a pressure let down valve downstream of the third heat exchanger network to reduce a pressure of a product mixture stream received from the third heat exchanger network;
the biomass slurry flow path further comprises a product cooler heat exchanger downstream of the pressure let down valve to reduce a temperature of a product mixture stream received from the third heat exchanger network.

* * * * *